US012016810B2

(12) United States Patent
Paul et al.

(10) Patent No.: US 12,016,810 B2
(45) Date of Patent: Jun. 25, 2024

(54) PATIENT SUPPORT APPARATUS WITH RAMP TRANSITION DETECTION

(71) Applicant: Stryker Corporation, Kalamazoo, MI (US)

(72) Inventors: Anish Paul, Kalamazoo, MI (US); Richard A. Derenne, Portage, MI (US); Gary L. Bartley, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 171 days.

(21) Appl. No.: 17/849,906

(22) Filed: Jun. 27, 2022

(65) Prior Publication Data

US 2023/0149233 A1 May 18, 2023

Related U.S. Application Data

(60) Provisional application No. 63/278,722, filed on Nov. 12, 2021.

(51) Int. Cl.
*A61G 7/00* (2006.01)
*A61G 7/05* (2006.01)

(52) U.S. Cl.
CPC ........ *A61G 7/0528* (2016.11); *A61G 2203/10* (2013.01); *A61G 2203/36* (2013.01); *A61G 2203/40* (2013.01)

(58) Field of Classification Search
CPC .... A61G 7/0528; A61G 7/08; A61G 2203/10; A61G 2203/36; A61G 2203/40
See application file for complete search history.

(56) References Cited

U.S. PATENT DOCUMENTS

| | | | | |
|---|---|---|---|---|
| 6,000,486 | A * | 12/1999 | Romick | B62D 51/04 180/209 |
| 8,442,738 | B2 * | 5/2013 | Patmore | A61G 1/0237 180/19.1 |
| 9,937,943 | B2 * | 4/2018 | Nilsson | B60L 15/20 |
| 10,045,893 | B2 * | 8/2018 | Childs | A61G 1/0237 |
| 10,206,835 | B2 * | 2/2019 | Jurka | B60B 33/0092 |
| 10,507,145 | B2 * | 12/2019 | DeLuca | A61G 1/0275 |
| 10,603,234 | B2 | 3/2020 | Puvogel et al. | |
| 10,799,403 | B2 * | 10/2020 | Paul | A61G 1/0268 |
| 10,828,211 | B2 * | 11/2020 | Jönsson | A61G 1/0268 |

(Continued)

*Primary Examiner* — Phutthiwat Wongwian
*Assistant Examiner* — Sherman D Manley
(74) *Attorney, Agent, or Firm* — Howard & Howard Attorneys PLLC

(57) ABSTRACT

A patient support apparatus for transporting a patient over a floor surface is described herein. The patient support apparatus includes a drive system with a drive member, a user interface for receiving user commands from a user to operate the drive system, and a control system for operating the drive system. The control system includes a memory device configured to store a plurality of transition profiles and a controller configured to sense a plurality of positions of the drive member relative to the support structure, calculate a distance traveled by the patient support apparatus over the floor surface, compare the plurality of positions of the drive member and the distance traveled by the patient support apparatus with the transition profiles, and determine that the patient support apparatus is traveling on an inclined floor surface.

20 Claims, 24 Drawing Sheets

(56) References Cited

U.S. PATENT DOCUMENTS

| | | | | |
|---|---|---|---|---|
| 10,912,685 | B2 * | 2/2021 | Childs | A61G 1/0231 |
| 11,039,964 | B2 * | 6/2021 | Paul | A61G 1/0237 |
| 11,071,662 | B2 * | 7/2021 | Derenne | A61G 7/08 |
| 11,304,860 | B2 * | 4/2022 | Derenne | A61G 7/08 |
| 11,484,447 | B2 * | 11/2022 | Derenne | A61G 7/08 |
| 11,806,296 | B2 * | 11/2023 | Derenne | A61G 1/0268 |
| 2003/0159861 | A1 * | 8/2003 | Hopper | A61G 1/0268 180/22 |
| 2014/0331406 | A1 * | 11/2014 | Haider | A61G 13/128 701/23 |
| 2015/0049959 | A1 * | 2/2015 | Johnson | H04W 4/029 382/305 |
| 2016/0137216 | A1 * | 5/2016 | Nilsson | B62B 3/001 701/1 |
| 2016/0302985 | A1 | 10/2016 | Tessmer et al. | |
| 2018/0252535 | A1 * | 9/2018 | Bhimavarapu | G01C 21/206 |
| 2019/0046373 | A1 * | 2/2019 | Coulter | A61G 5/041 |
| 2020/0046586 | A1 | 2/2020 | Furman et al. | |
| 2020/0155383 | A1 | 5/2020 | Derenne et al. | |
| 2021/0196533 | A1 * | 7/2021 | Derenne | H02P 6/06 |
| 2021/0196548 | A1 * | 7/2021 | Derenne | A61G 7/1048 |

* cited by examiner

PATIENT SUPPORT APPARATUS WITH RAMP TRANSITION DETECTION

CROSS-REFERENCE TO RELATED APPLICATIONS

The subject patent application claims priority to, and all the benefits of, U.S. Provisional Patent Application No. 63/278,722, filed on Nov. 12, 2021, the entire contents of which are incorporated by reference herein.

BACKGROUND

Patient support systems facilitate care of patients in a health care setting. Patient support systems may comprise patient support apparatuses such as, for example, hospital beds, stretchers, cots, wheelchairs, and transport chairs, to move patients between locations. A conventional patient support apparatus comprises a base, a patient support surface, and several support wheels, such as four swiveling caster wheels. Often, the patient support apparatus has one or more non-swiveling auxiliary wheels, in addition to the four caster wheels. The auxiliary wheel, by virtue of its non-swiveling nature, is employed to help control movement of the patient support apparatus over a floor surface in certain situations.

Those having ordinary skill in the art will appreciate that patient support apparatuses which employ powered auxiliary wheels can advantageously help caregivers propel, position, and manipulate the patient support apparatus. For example, powered auxiliary wheels can help caregivers move the patient support apparatus up or down ramps, around corners, and the like, and also may facilitate fine positioning of the patient support apparatus in rooms, elevators, and the like.

While patient support apparatuses have generally performed well for their intended use, there remains a need in the art for improved usability and adaptability to enable utilization of patient support apparatus in and between different environments and use case scenarios.

SUMMARY

The present disclosure is directed towards a patient support apparatus with a support structure. The support structure comprises a base and a frame, and the frame includes a velocity sensor configured to sense a velocity of the patient support apparatus over a floor surface. A support wheel is coupled to the support structure. The patient support apparatus further comprises an auxiliary wheel assembly, which includes an auxiliary wheel coupled to the support structure to influence motion of the patient support apparatus over the floor surface. The auxiliary wheel assembly is positionable to a deployed position with the auxiliary wheel engaging the floor surface and to a retracted position with the auxiliary wheel spaced a distance from the floor surface. The auxiliary wheel assembly also includes an auxiliary wheel actuator operatively coupled to the auxiliary wheel by a wheel support structure. The auxiliary wheel assembly further includes an auxiliary wheel drive system having a motor coupled to the auxiliary wheel to rotate the auxiliary wheel relative to the support structure at a rotational speed, and a control system coupled to the auxiliary wheel drive system for operating the auxiliary wheel drive system. The control system includes an auxiliary wheel position sensor coupled to the wheel support structure and configured to sense a plurality of positions of the auxiliary wheel actuator relative to the frame of the support structure. The control system further includes a memory device configured to store a plurality of transition profiles, wherein at least one of the plurality of transition profiles represents a transition over an inclined floor surface. The control system additionally includes a processor coupled to the memory device and programmed to calculate, based on the velocity of the patient support apparatus over the floor surface, a distance traveled by the patient support apparatus over the floor surface. The processor is further configured to compare the plurality of positions of the auxiliary wheel actuator and the distance traveled by the patient support apparatus with the inclined floor surface profile, and determine that the patient support apparatus is traveling on an inclined floor surface.

The present disclosure is also directed towards a patient support apparatus with a support structure, a support wheel coupled to the support structure, and a drive system. The drive system includes a drive member coupled to the support structure to influence motion of the patient support apparatus over a floor surface, a motor coupled to the drive member to operate the drive member at a speed, and a motor control circuit for transmitting power signals from a power source to the motor. The patient support apparatus also includes a user interface for receiving user commands from a user to operate the drive system. The patient support apparatus further includes a control system coupled to the user interface and the drive system for operating the drive system, the control system including: a memory device configured to store a plurality of transition profiles, wherein at least one of the plurality of transition profiles represents a transition over an inclined floor surface, and a processor coupled to the memory device and configured to: sense a plurality of positions of the drive member relative to the support structure, calculate a distance traveled by the patient support apparatus over the floor surface, compare the plurality of positions of the auxiliary wheel actuator and the distance traveled by the patient support apparatus with the inclined floor surface profile, and determine that the patient support apparatus is traveling on an inclined floor surface.

The present disclosure is also directed towards a patient support apparatus with a support structure, a support wheel coupled to the support structure, and a drive system. The drive system includes a drive member coupled to the support structure to influence motion of the patient support apparatus over a floor surface, a motor coupled to the drive member to operate the drive member at a speed, and a motor control circuit for transmitting power signals from a power source to the motor. The patient support apparatus also includes a user interface for receiving user commands from a user to operate the drive system. The patient support apparatus also includes a floor sensor operatively attached to the support structure to determine a distance to the floor surface. The patient support apparatus further includes a control system coupled to the user interface and the drive system for operating the drive system, the control system including: a memory device configured to store a plurality of transition profiles, wherein at least one of the plurality of transition profiles represents a transition over an inclined floor surface, and a processor coupled to the memory device and configured to: sense changes in the distance to the floor surface based on signals received from the floor sensor, calculate a distance traveled by the patient support apparatus over the floor surface, compare the changes in the distance to the floor surface and the distance traveled by the patient support apparatus with the plurality of transition profiles, and determine that the patient support apparatus is traveling on an inclined floor surface.

DETAILED DESCRIPTION

Figure 1:
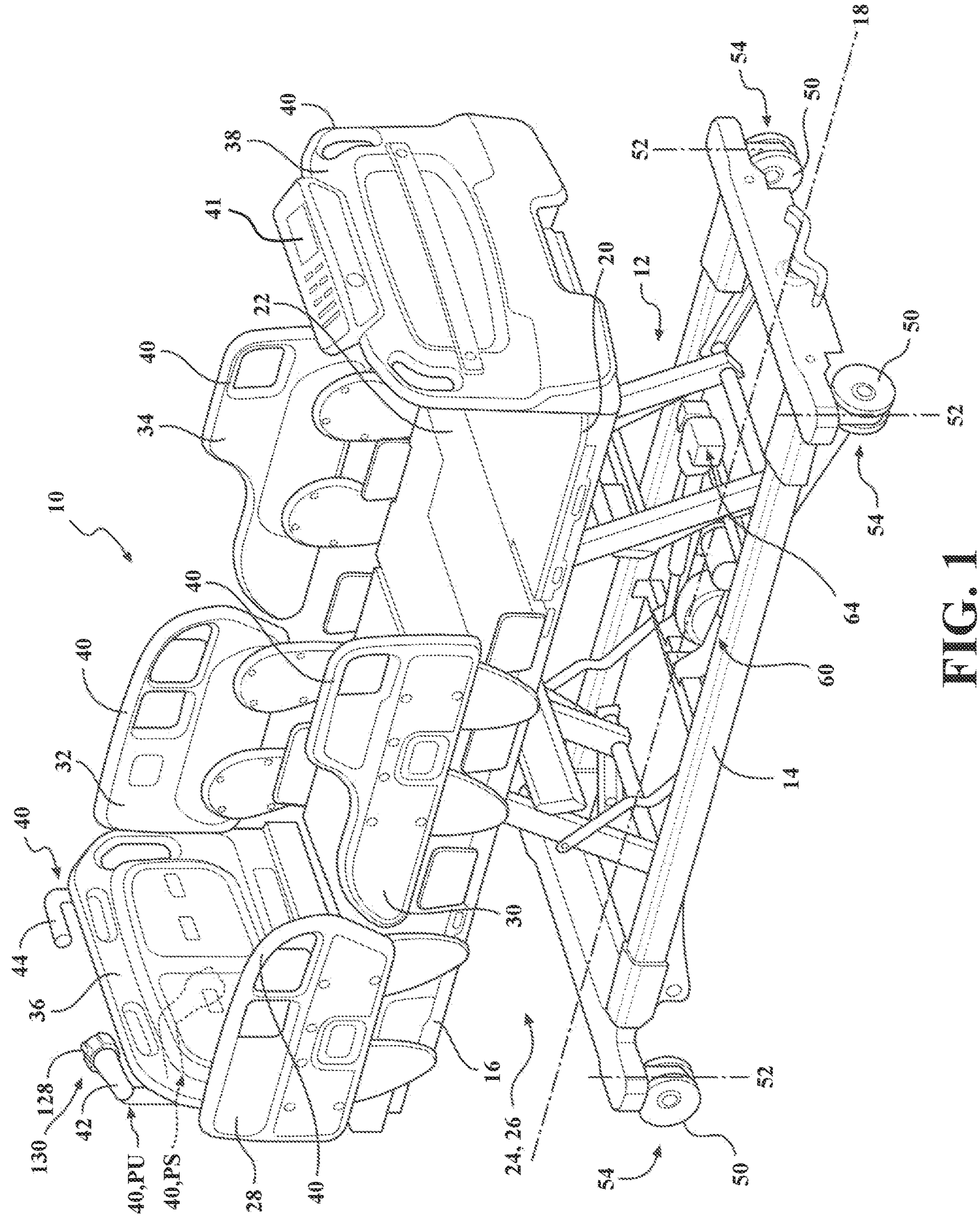
FIG. 1 is a perspective view of a patient support apparatus, according to the present disclosure.

Referring to FIG. 1, a patient transport system comprising a patient support apparatus 10 is shown for supporting a patient in a health care setting. The patient support apparatus 10 illustrated in FIG. 1 comprises a hospital bed. In some versions, however, the patient support apparatus 10 may comprise a stretcher, a cot, a wheelchair, and a transport chair, or similar apparatus, utilized in the care of a patient to transport the patient between locations.

A support structure 12 provides support for the patient. The support structure 12 illustrated in FIG. 1 comprises a base 14 and an intermediate frame 16. The base 14 defines a longitudinal axis 18 from a head end to a foot end. The intermediate frame 16 is spaced above the base 14. The support structure 12 also comprises a patient support deck 20 disposed on the intermediate frame 16. The patient support deck 20 comprises several sections, some of which articulate (e.g., pivot) relative to the intermediate frame 16, such as a fowler section, a seat section, a thigh section, and a foot section. The patient support deck 20 provides a patient support surface 22 upon which the patient is supported.

In certain versions, such as is depicted in FIG. 1, the patient support apparatus 10 further comprises a lift assembly, generally indicated at 24, which operates to lift and lower the intermediate frame 16 relative to the base 14. The lift assembly 24 is configured to move the intermediate frame 16 between a plurality of vertical configurations relative to the base 14 (e.g., between a minimum height and a maximum height, or to any desired position in between). To this end, the lift assembly 24 comprises one or more bed lift actuators 26 which are arranged to facilitate movement of the intermediate frame 16 with respect to the base 14. The bed lift actuators 26 may be realized as linear actuators, rotary actuators, or other types of actuators, and may be electrically operated, hydraulic, electro-hydraulic, or the like. It is contemplated that, in some versions, separate lift actuators could be disposed to facilitate independently lifting the head and foot ends of the intermediate frame 16 and, in some versions, only one lift actuator may be employed, (e.g., to raise only one end of the intermediate frame 16). The construction of the lift assembly 24 and/or the bed lift actuators 26 may take on any known or conventional design, and is not limited to that specifically illustrated. One exemplary lift assembly that can be utilized on the patient support apparatus 10 is described in U.S. Patent Application Publication No. 2016/0302985, entitled "Patient Support Lift Assembly", which is hereby incorporated herein by reference in its entirety.

A mattress, although not shown, may be disposed on the patient support deck 20. The mattress comprises a secondary patient support surface upon which the patient is supported. The base 14, intermediate frame 16, patient support deck 20, and patient support surface 22 each have a head end and a foot end corresponding to designated placement of the patient's head and feet on the patient support apparatus 10. The construction of the support structure 12 may take on any known or conventional design, and is not limited to that specifically set forth above. In addition, the mattress may be omitted in certain versions, such that the patient rests directly on the patient support surface 22.

Side rails 28, 30, 32, 34 are supported by the base 14. A first side rail 28 is positioned at a right head end of the intermediate frame 16. A second side rail 30 is positioned at a right foot end of the intermediate frame 16. A third side rail 32 is positioned at a left head end of the intermediate frame 16. A fourth side rail 34 is positioned at a left foot end of the intermediate frame 16. If the patient support apparatus 10 is a stretcher, there may be fewer side rails. The side rails 28, 30, 32, 34 are movable between a raised position in which they block ingress and egress into and out of the patient support apparatus 10 and a lowered position in which they are not an obstacle to such ingress and egress. The side rails 28, 30, 32, 34 may also be movable to one or more intermediate positions between the raised position and the lowered position. In still other configurations, the patient support apparatus 10 may not comprise any side rails.

A headboard 36 and a footboard 38 are coupled to the intermediate frame 16. In some versions, when the headboard 36 and footboard 38 are provided, the headboard 36 and footboard 38 may be coupled to other locations on the patient support apparatus 10, such as the base 14. In still other versions, the patient support apparatus 10 does not comprise the headboard 36 and/or the footboard 38.

User interfaces 40, such as handles, are shown integrated into the footboard 38 and side rails 28, 30, 32, 34 to facilitate movement of the patient support apparatus 10 over floor surfaces. The user interfaces 40 are graspable by the user to manipulate the patient support apparatus 10 for movement.

Other forms of the user interface 40 are also contemplated. The user interface may simply be a surface on the patient support apparatus 10 upon which the user logically applies force to cause movement of the patient support apparatus 10 in one or more directions, also referred to as a push location. This may comprise one or more surfaces on the intermediate frame 16 or base 14. This could also comprise one or more surfaces on or adjacent to the headboard 36, footboard 38, and/or side rails 28, 30, 32, 34.

Additional user interfaces 40 may be integrated into the headboard 36, footboard 38, and/or other components of the patient support apparatus 10. Such additional user interfaces 40 may include, for example, a graphical user interface 41. The user interface 41 may be configured to receive user commands from a user to operate an auxiliary wheel assembly 60 of a drive system 78 configured to influence motion of the patient support apparatus 10.

In the version shown in FIG. 1, one set of user interfaces 40 comprises a first handle 42 and a second handle 44. The first and second handles 42, 44 are coupled to the intermediate frame 16 proximal to the head end of the intermediate frame 16 and on opposite sides of the intermediate frame 16 so that the user may grasp the first handle 42 with one hand and the second handle 44 with the other. As is described in greater detail below in connection with FIGS. 1 and 6, in some versions the first handle 42 comprises an inner support 46 defining a central axis C, and handle body 48 configured to be gripped by the user. In some versions, the first and second handles 42, 44 are coupled to the headboard 36. In still other versions the first and second handles 42, 44 are coupled to another location permitting the user to grasp the first and second handle 42, 44. As shown in FIG. 1, one or more of the user interfaces (e.g., the first and second handles 42, 44) may be arranged for movement relative to the intermediate frame 16, or another part of the patient support apparatus 10, between a use position PU arranged for engagement by the user, and a stow position PS (depicted in phantom), with movement between the use position PU and the stow position PS being facilitated such as by a hinged or pivoting connection to the intermediate frame 16 (not shown in detail). Other configurations are contemplated.

Support wheels 50 are coupled to the base 14 to support the base 14 on a floor surface such as a hospital floor. The support wheels 50 allow the patient support apparatus 10 to move in any direction along the floor surface by swiveling to assume a trailing orientation relative to a desired direction of movement. In the version shown, the support wheels 50 comprise four support wheels each arranged in corners of the base 14. The support wheels 50 shown are caster wheels able to rotate and swivel about swivel axes 52 during transport. Each of the support wheels 50 forms part of a caster assembly 54. Each caster assembly 54 is mounted to the base 14. It should be understood that various configurations of the caster assemblies 54 are contemplated. In addition, in some versions, the support wheels 50 are not caster wheels and may be non-steerable, steerable, non-powered, powered, or combinations thereof. Additional support wheels 50 are also contemplated.

In some versions, the patient support apparatus 10 comprises a support wheel brake actuator 56 (shown schematically in FIG. 8) operably coupled to one or more of the support wheels 50 for braking one or more support wheels 50. In some versions, the support wheel brake actuator 56 may comprise a brake member 58 coupled to the base 14 and movable between a braked position engaging one or more of the support wheels 50 to brake the support wheel 50 and a released position permitting one or more of the support wheels 50 to rotate freely.

Figure 2:
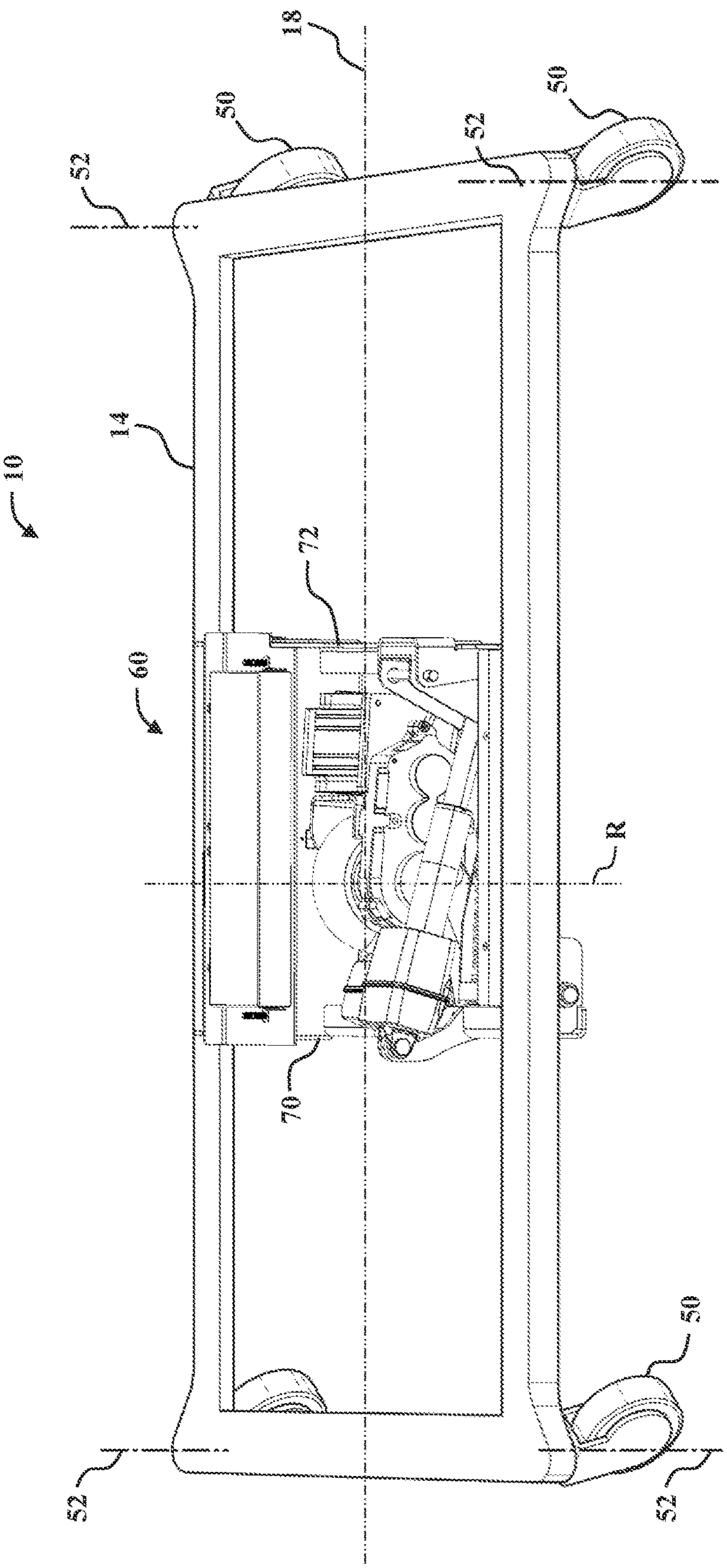
FIG. 2 is a perspective view of an auxiliary wheel assembly of the patient support apparatus coupled to a base of the patient support apparatus shown in FIG. 1.
Figure 3:
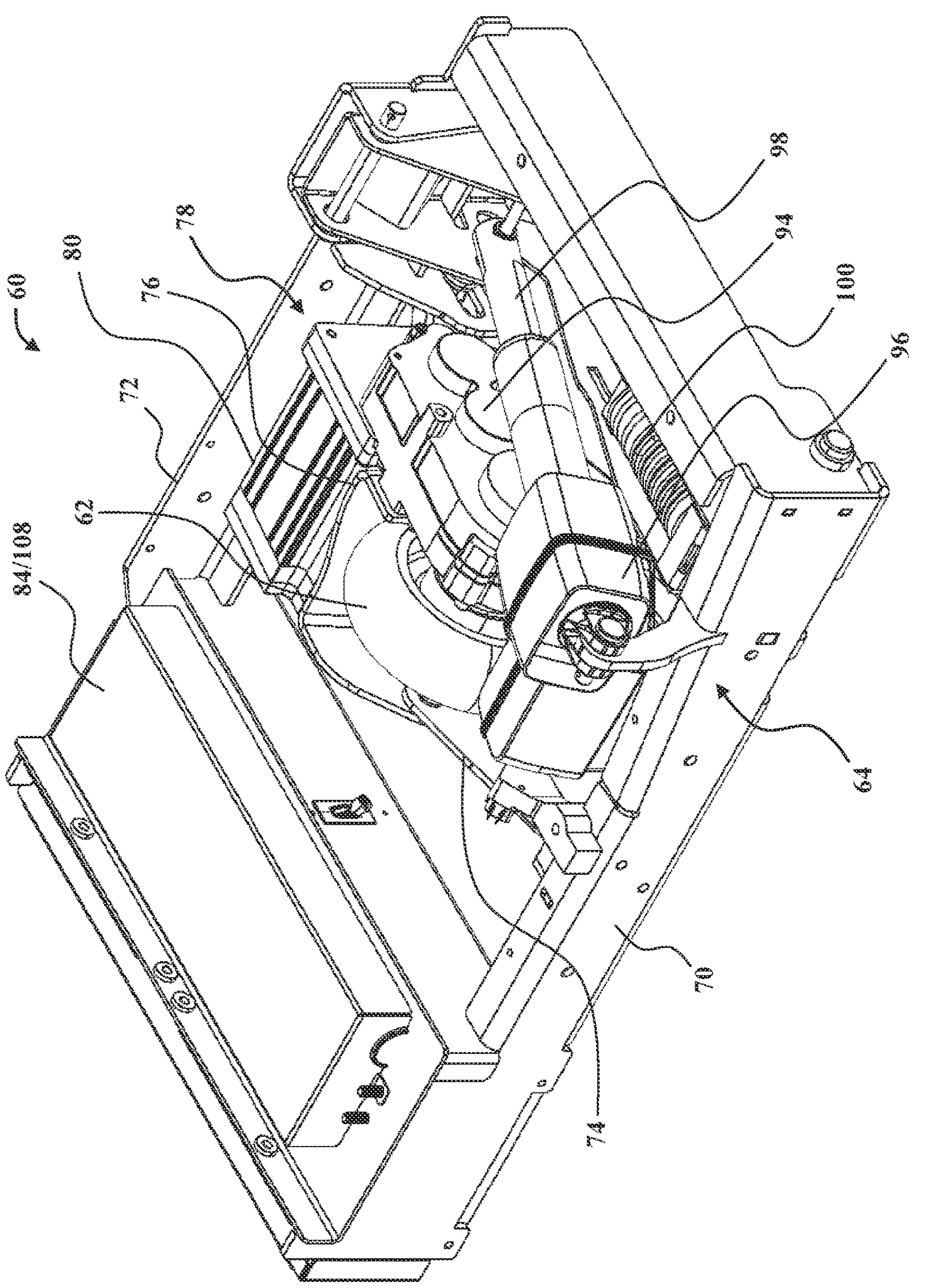
FIG. 3 is a perspective view of the auxiliary wheel assembly shown in FIG. 2 comprising an auxiliary wheel, a lift actuator, and a spring cartridge assembly.

Referring to FIGS. 1-3, the auxiliary wheel assembly 60 is coupled to the base 14. The auxiliary wheel assembly 60 forms part of the drive system 78 in the illustrated versions. As noted above, the drive system 78 is configured to influence motion of the patient support apparatus 10 during transportation over the floor surface. To this end, the drive system 78 generally includes a drive member 62 and a motor 80 coupled to the drive member 62 to operate the drive member 62 at various speeds. In the illustrated versions, the drive member 62 is realized as an auxiliary wheel 62 forming part of the auxiliary wheel assembly 60 of an auxiliary wheel drive system 78 as described in greater detail below. However, those having ordinary skill in the art will appreciate that the drive system 78 could be configured in other ways, with various types of drive members 62 other than those configured as auxiliary wheels 62 of auxiliary wheel assemblies 60. By way of non-limiting example, the drive member 62 could be realized by various types and/or arrangements of one or more belts, treads, wheels, tires, and the like, which may be arranged in various ways about the patient support apparatus 10 and may be deployable, retractable, or similarly movable, or may be generally engaged with the floor surface (e.g., realized as powered wheels at one or more corners of the base 14). Accordingly, it will be appreciated that the auxiliary wheel drive system 78 described and illustrated herein represents one type of drive system 78 contemplated by the present disclosure, and the auxiliary wheel 62 described and illustrated herein represents one type of drive member 62 contemplated by the present disclosure.

Figure 4:
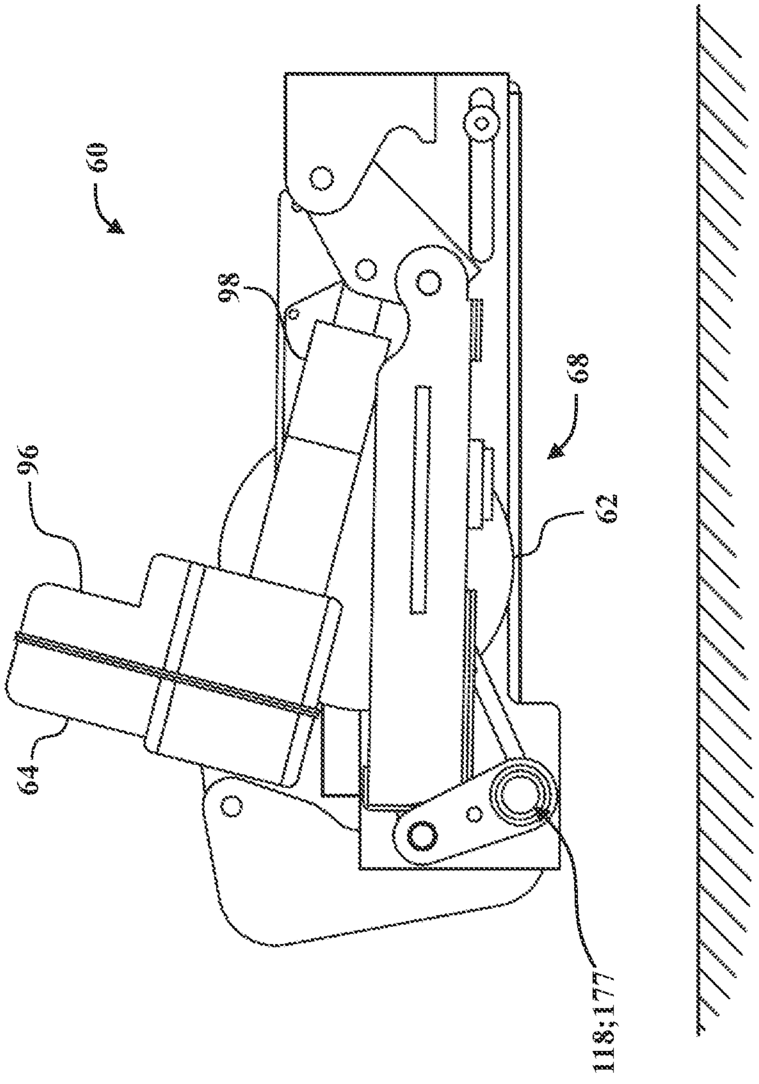
FIG. 4 is an elevational view of the auxiliary wheel assembly shown in FIG. 2 in a retracted position.

With continued reference to FIGS. 1-3, the illustrated auxiliary wheel assembly 60 employs an auxiliary wheel actuator 64 operatively coupled to the auxiliary wheel 62 and operable to move the auxiliary wheel 62 between a deployed position 66 (see FIG. 5) engaging the floor surface, and a retracted position 68 (see FIG. 4) spaced away from and out of contact with the floor surface. The retracted position 68 may alternatively be referred to as the "fully retracted position." The auxiliary wheel 62 may also be positioned in one or more intermediate positions between the deployed position 66 (see FIG. 5) and the retracted position 68 (FIG. 4). The intermediate positions may alternatively be referred to as a "partially retracted position," or may also refer to another "retracted position" (e.g., compared to the "fully" retracted position 68 depicted in FIG. 4). The auxiliary wheel 62 influences motion of the patient support apparatus 10 during transportation over the floor surface when the auxiliary wheel 62 is in the deployed position 66. In some versions, the auxiliary wheel assembly 60 comprises an additional auxiliary wheel movable with the auxiliary wheel 62 between the deployed position 66 and the retracted position 68 via the auxiliary wheel actuator 64.

By deploying the auxiliary wheel 62 on the floor surface, the patient support apparatus 10 can be easily moved down long, straight hallways or around corners, owing to a non-swiveling nature of the auxiliary wheel 62. When the auxiliary wheel 62 is in the retracted position 68 (see FIG. 4) or in one of the intermediate positions (e.g. spaced from the floor surface), the patient support apparatus 10 may be subject to moving in an undesired direction due to uncontrollable swiveling of the support wheels 50. For instance, during movement down long, straight hallways, the patient support apparatus 10 may be susceptible to "dog tracking," which refers to undesirable sideways movement of the patient support apparatus 10. Additionally, when cornering, without the auxiliary wheel 62 deployed, and with all of the support wheels 50 able to swivel, there is no wheel assisting with steering through the corner, unless one or more of the support wheels 50 are provided with steer lock capability and the steer lock is activated.

The auxiliary wheel 62 may be arranged parallel to the longitudinal axis 18 of the base 14. The differently, the auxiliary wheel 62 rotates about a rotational axis R (see FIG. 2) oriented perpendicularly to the longitudinal axis 18 of the base 14 (albeit offset in some cases from the longitudinal axis 18). In the version shown, the auxiliary wheel 62 is incapable of swiveling about a swivel axis. In some versions, the auxiliary wheel 62 may be capable of swiveling, but can be locked in a steer lock position in which the auxiliary wheel 62 is locked to solely rotate about the rotational axis R oriented perpendicularly to the longitudinal axis 18. In still other versions, the auxiliary wheel 62 may be able to freely swivel without any steer lock functionality or may be steered.

The auxiliary wheel 62 may be located to be deployed inside a perimeter of the base 14 and/or within a support wheel perimeter defined by the swivel axes 52 of the support wheels 50. In some versions, such as those employing a single auxiliary wheel 62, the auxiliary wheel 62 may be located near a center of the support wheel perimeter, or offset from the center. In this case, the auxiliary wheel 62 may also be referred to as a fifth wheel. In some versions, the auxiliary wheel 62 may be disposed along the support wheel perimeter or outside of the support wheel perimeter. In the version shown, the auxiliary wheel 62 has a diameter larger than a diameter of the support wheels 50. In some versions, the auxiliary wheel 62 may have the same or a smaller diameter than the support wheels 50.

In the version shown in FIG. 3, the base 14 comprises a first cross-member 70 and a second cross-member 72. The auxiliary wheel assembly 60 is disposed between and coupled to the cross-members 70, 72. The auxiliary wheel assembly 60 comprises a first auxiliary wheel frame 74 coupled to and arranged to articulate (e.g. pivot) relative to the first cross-member 70. The auxiliary wheel assembly 60 further comprises a second auxiliary wheel frame 76 pivotably coupled to the first auxiliary wheel frame 74 and the second cross-member 72. The second auxiliary wheel frame 76 is arranged to articulate and translate relative to the second cross-member 72.

Figure 9:
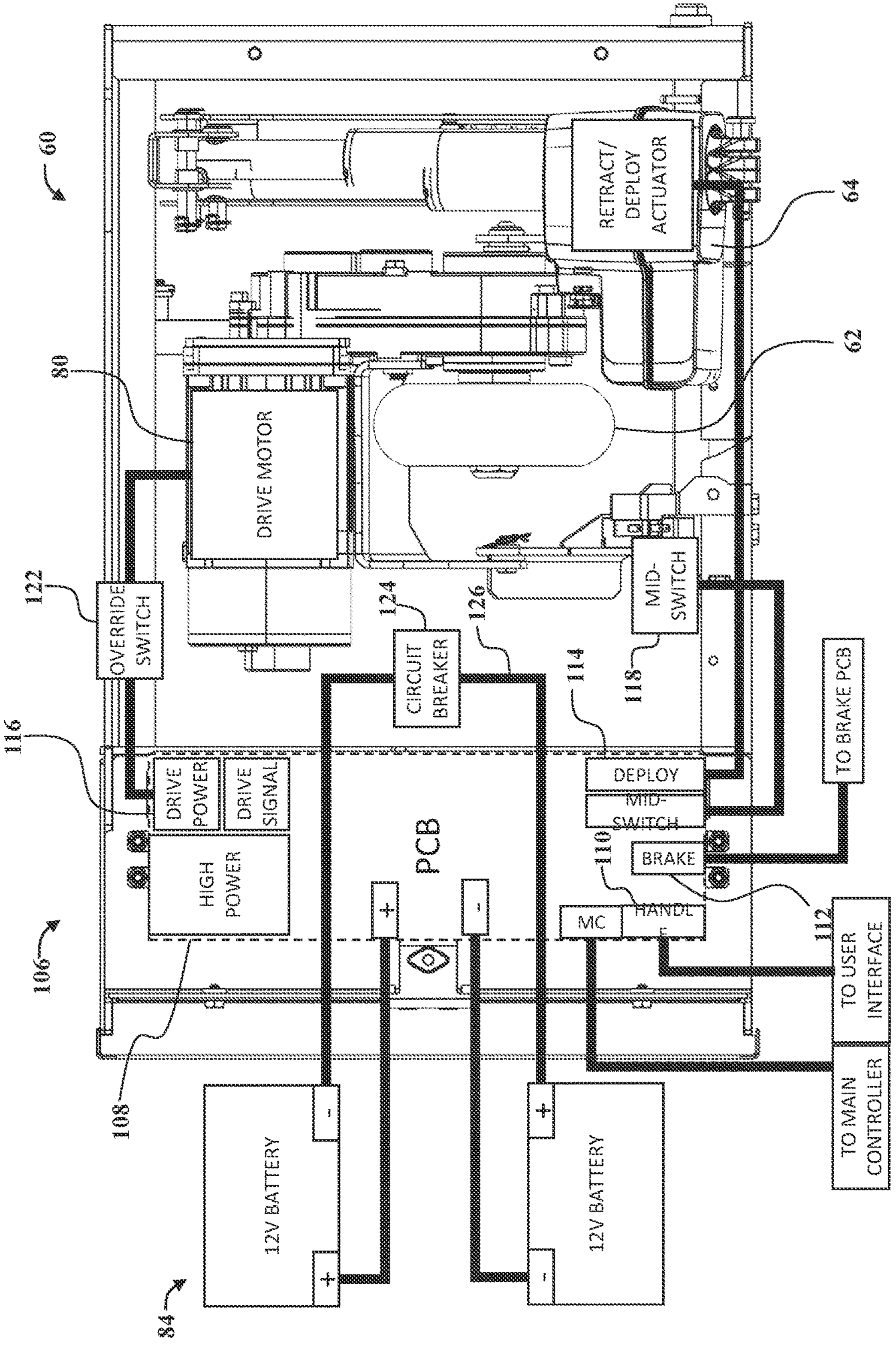
FIG. 9 is a schematic wire diagram of a control circuit that may be used with the auxiliary wheel assembly shown in FIG. 1.
Figure 10:
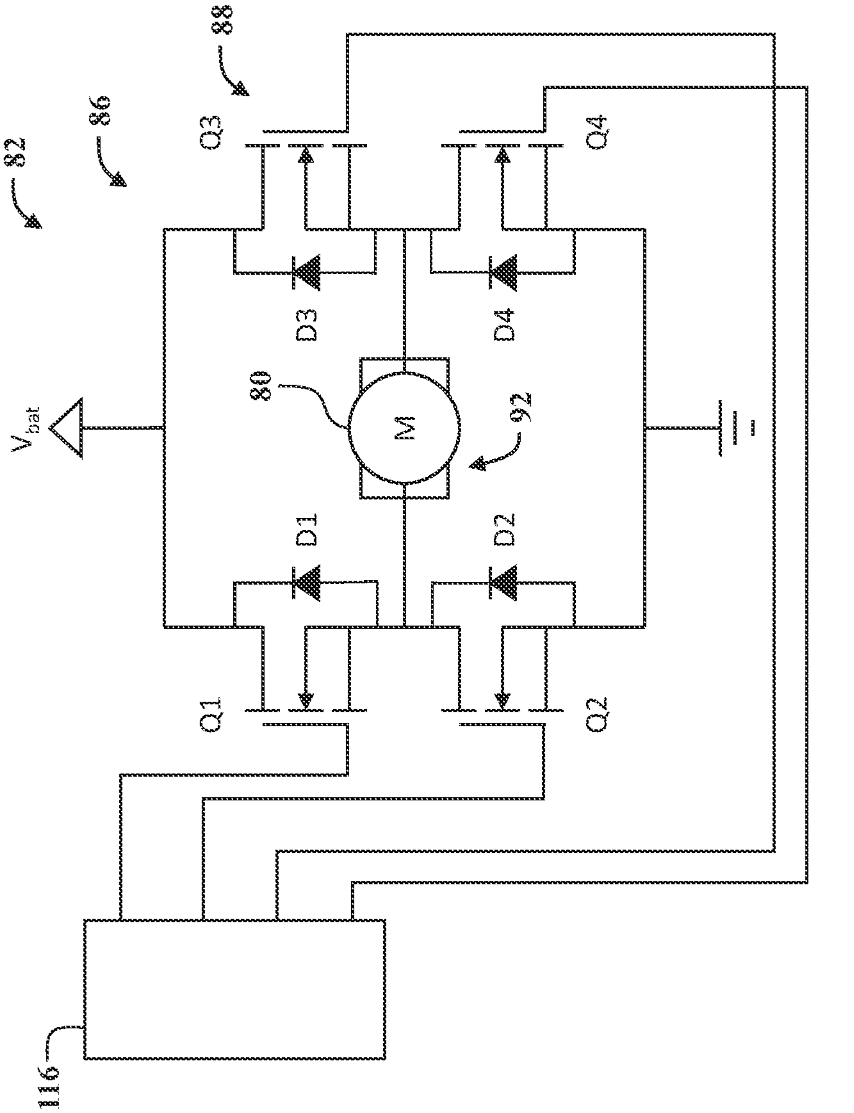
FIG. 10 is a schematic wire diagram of a motor control circuit that may be used with the auxiliary wheel assembly shown in FIG. 1.

In the version shown in FIGS. 2-3, the auxiliary wheel assembly 60 comprises an auxiliary wheel drive system 78 (described in more detail below) operatively coupled to the auxiliary wheel 62. The auxiliary wheel drive system 78 is configured to drive (e.g. rotate) the auxiliary wheel 62. In the version shown, the auxiliary wheel drive system 78 comprises the motor 80 coupled to the auxiliary wheel 62 for rotating the auxiliary wheel 62 relative to the support structure and a motor control circuit 82 (shown in FIGS. 9 and 10) that is configured to transmit control and power signals to the motor 80. The motor control circuit 82 is also coupled to a power source 84 (shown schematically in FIG. 9) for use in generating the control and power signals that are used to operate the motor 80. In the version shown, the motor control circuit 82 includes a motor bridge circuit 86 that includes a plurality of field-effect transistor (FET) switches 88 (e.g. Q1, Q2, Q3, Q4 shown in FIG. 10) that are coupled to motor leads 92 of the motor 80. In some versions, the motor 80 includes a 3-phase BLDC motor. In some versions, any suitable motor may be used with auxiliary wheel drive system 78.

The auxiliary wheel drive system 78 also includes a gear train 94 that is coupled to the motor 80 and an axle of the auxiliary wheel 62. In the version shown, the auxiliary wheel 62, the gear train 94, and the motor 80 are arranged and supported by the second auxiliary wheel frame 76 to articulate and translate with the second auxiliary wheel frame 76 relative to the second cross-member 72. In some versions, the axle of the auxiliary wheel 62 is coupled directly to the second auxiliary wheel frame 76 and the auxiliary wheel drive system 78 drives the auxiliary wheel 62 in another manner. Electrical power is provided from the power source 84 to energize the motor 80. The motor 80 converts electrical power from the power source 84 to torque supplied to the gear train 94. The gear train 94 transfers torque to the auxiliary wheel 62 to rotate the auxiliary wheel 62.

In the version shown, the auxiliary wheel actuator 64 is a linear actuator comprising a housing 96 and a drive rod 98 extending from the housing 96. The drive rod 98 has a proximal end received in the housing 96 and a distal end spaced from the housing 96. The distal end of the drive rod 98 is configured to be movable relative to the housing 96 to extend and retract an overall length of the auxiliary wheel actuator 64. In the version shown, the auxiliary wheel assembly 60 also comprises a biasing device such as a spring cartridge 100 to apply a biasing force. Operation of the auxiliary wheel actuator 64 and the spring cartridge 100 to retract/deploy the auxiliary wheel 62 is described in U.S. patent application Ser. No. 16/690,217, filed on Nov. 21, 2019, entitled, "Patient Transport Apparatus With Controlled Auxiliary Wheel Deployment," which is hereby incorporated herein by reference.

Figure 5:
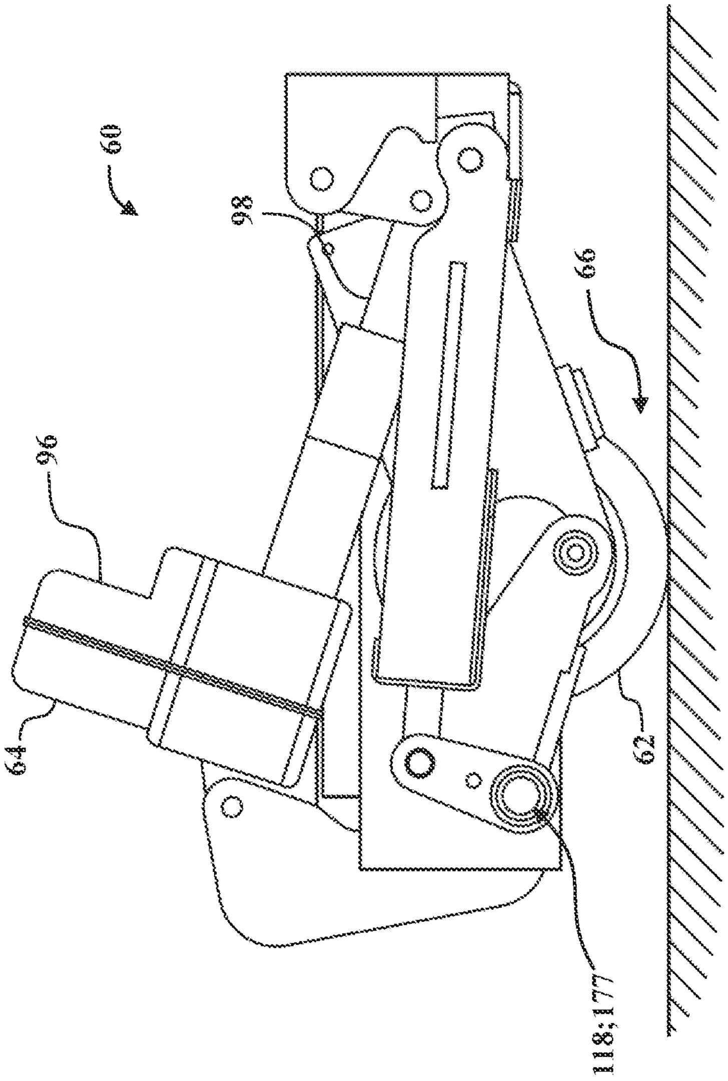
FIG. 5 is an elevational view of the auxiliary wheel assembly shown in FIG. 2 in a deployed position.

Referring to FIGS. 4 and 5, when moving to the retracted position 68, auxiliary wheel actuator 64 retracts the drive rod 98 into the housing 96 to move the auxiliary wheel 62 from the deployed position 66 to the retracted position 68. When moving to the deployed position 66, auxiliary wheel actuator 64 extends the drive rod 98 from the housing 96 to move the auxiliary wheel 62 from the retracted position 68 to the deployed position 66. Various linkages are contemplated for such movement, including those disclosed in U.S. patent application Ser. No. 16/690,217, filed on Nov. 21, 2019, entitled, "Patient Transport Apparatus With Controlled Auxiliary Wheel Deployment," which is incorporated herein by reference. In some versions, the housing 96 of the auxiliary wheel actuator 64 may be fixed to the cross member 70 and directly connected to the auxiliary wheel 62 to directly retract/deploy the auxiliary wheel 62. Other configurations are also contemplated.

In some versions, the auxiliary wheel assembly 60 comprises an auxiliary wheel brake actuator 102 (shown schematically in FIG. 8) operably coupled to the auxiliary wheel 62 for braking the auxiliary wheel 62. The auxiliary wheel brake actuator 102 may comprise a brake member 104 coupled to the base 14 and movable between a braked position engaging the auxiliary wheel 62 to brake the auxiliary wheel 62 and a released position permitting the auxiliary wheel 62 to rotate.

In the version shown, the auxiliary wheel assembly 60 includes an auxiliary wheel assembly control circuit 106 (see FIGS. 9 and 10) that is coupled to the auxiliary wheel actuator 64, the auxiliary wheel drive system 78, the auxiliary wheel brake actuator 102, and a power supply 84 for controlling operation of the auxiliary wheel assembly 60. In some versions, the power supply 84 may include a pair of rechargeable 12-volt batteries for providing electrical power to the auxiliary wheel assembly 60. In some versions, the power supply 84 may include one or more batteries that may be rechargeable and/or non-rechargeable and may be rated for use at voltages other than 12-volts. In some versions, as shown in FIG. 9, the auxiliary wheel assembly control circuit 106 includes a printed circuit board 108 mounted to the base 14 and having a user interface control unit 110, a brake control unit 112, an auxiliary wheel actuator control unit 114, and an auxiliary wheel control unit 116 mounted thereon. The auxiliary wheel assembly control circuit 106 may also include one or more auxiliary wheel position sensors 118, one or more auxiliary wheel speed sensors 120 (shown in FIG. 8), an override switch 122 operable to disconnect power to the motor 80, and a circuit breaker 124 coupled to the power supply 84.

In some versions, the auxiliary wheel assembly control circuit 106 includes an electrical current sense circuit 126 that is configured to sense the electrical current drawn by the motor 80 from the power supply 84. The electrical current sense circuit 126 may also be configured to sense an electrical current through motor phase windings of the motor 80. In addition, the electrical current sense circuit 126 may be configured to sense the electrical current drawn by the auxiliary wheel brake actuator 102.

The user interface control unit 110 is configured to transmit and receive instructions from the user interface 40 to enable a user to operate the auxiliary wheel assembly 60 with the user interface 40. The auxiliary wheel control unit 116 is configured to control the operation of the auxiliary wheel drive system 78 based on signals received from the user interface 40 via the user interface control unit 110. The brake control unit 112 is configured to operate the auxiliary wheel brake actuator 102 for braking the auxiliary wheel 62, or may control another electronic braking system on the patient support apparatus 10, such as one for the support wheels 50. The auxiliary wheel actuator control unit 114 is configured to operate the auxiliary wheel actuator 64 to move the auxiliary wheel 62 between the deployed and retracted positions. The auxiliary wheel position sensor 118 is configured to sense a position of the auxiliary wheel actuator 64 relative to the intermediate frame 16 or to the base 14 of the support structure 12. In some versions, the auxiliary wheel position sensor 118 may include a mid-switch that is configured to detect a position of the auxiliary wheel 62 in the deployed position 66, the retracted position 68, and any intermediate position between the deployed position 66 and the retracted position 68. In s In some versions, the auxiliary wheel position sensor 118 may be configured to read off a cam surface (not shown) and indicates when the auxiliary wheel 62 is in a specific position between fully deployed and fully retracted. In some versions, two or more limit switches, optical sensors, hall-effect sensors, or other types of sensors may be used to detect the current position of the auxiliary wheel 62.

The auxiliary wheel speed sensor 120 is configured to sense a rotational speed of the auxiliary wheel. In some versions, the auxiliary wheel speed sensor 120 may include one or more hall effect devices that are configured to sense rotation of the motor 80 (e.g., the motor shaft). The auxiliary wheel speed sensor 120 may also be used to detect a rotation of the auxiliary wheel 62 for use in determining whether the auxiliary wheel 62 is in a stop position and is not rotating. The auxiliary wheel speed sensor 120 may also be any other suitable sensor for measuring wheel speed, such as an optical encoder.

The override switch 122 is configured to disconnect power to the drive motor 80 to enable the auxiliary wheel 62 to rotate more freely. It should be appreciated that in some versions, such as that shown in FIG. 9, when power to the drive motor 80 is disconnected, frictional forces may still be present between the drive motor 80 and auxiliary wheel 62 by virtue of the gear train 94 such that rotation of the auxiliary wheel 62 is at least partially inhibited by the gear train 94. Depending on the nature of the gear train 94, the torque required to overcome such frictional forces vary. In some versions, the gear train 94 may be selected to minimize the torque required to manually drive the auxiliary wheel 62. In some versions, a clutch may be employed between the auxiliary wheel 62 and the gear train 94 that is operated to disconnect the gear train 94 from the auxiliary wheel 62 when the override switch 122 is activated. In some versions, the drive motor 80 may directly drive the auxiliary wheel 62 (e.g., without a gear train), in which case, the auxiliary wheel 62 may rotate freely when power to the drive motor 80 is disconnected. If the auxiliary wheel 62 remains stuck in the deployed position or an intermediate position, the auxiliary wheel assembly control circuit 106 may operate the override switch 122 to disconnect power to the drive motor 80 and allow the auxiliary wheel 62 to rotate more freely. The circuit breaker 124 is configured to trip if an accidental electrical current spike is detected. In addition, the circuit breaker 124 may be switched to an "off" position to disconnect the power supply 84 to save battery life for storage and shipping.

Although exemplary versions of an auxiliary wheel assembly 60 is described above and shown in the drawings, it should be appreciated that other configurations employing an auxiliary wheel actuator 64 to move the auxiliary wheel 62 between the retracted position 68 and deployed position 66 are contemplated.

Figure 6:
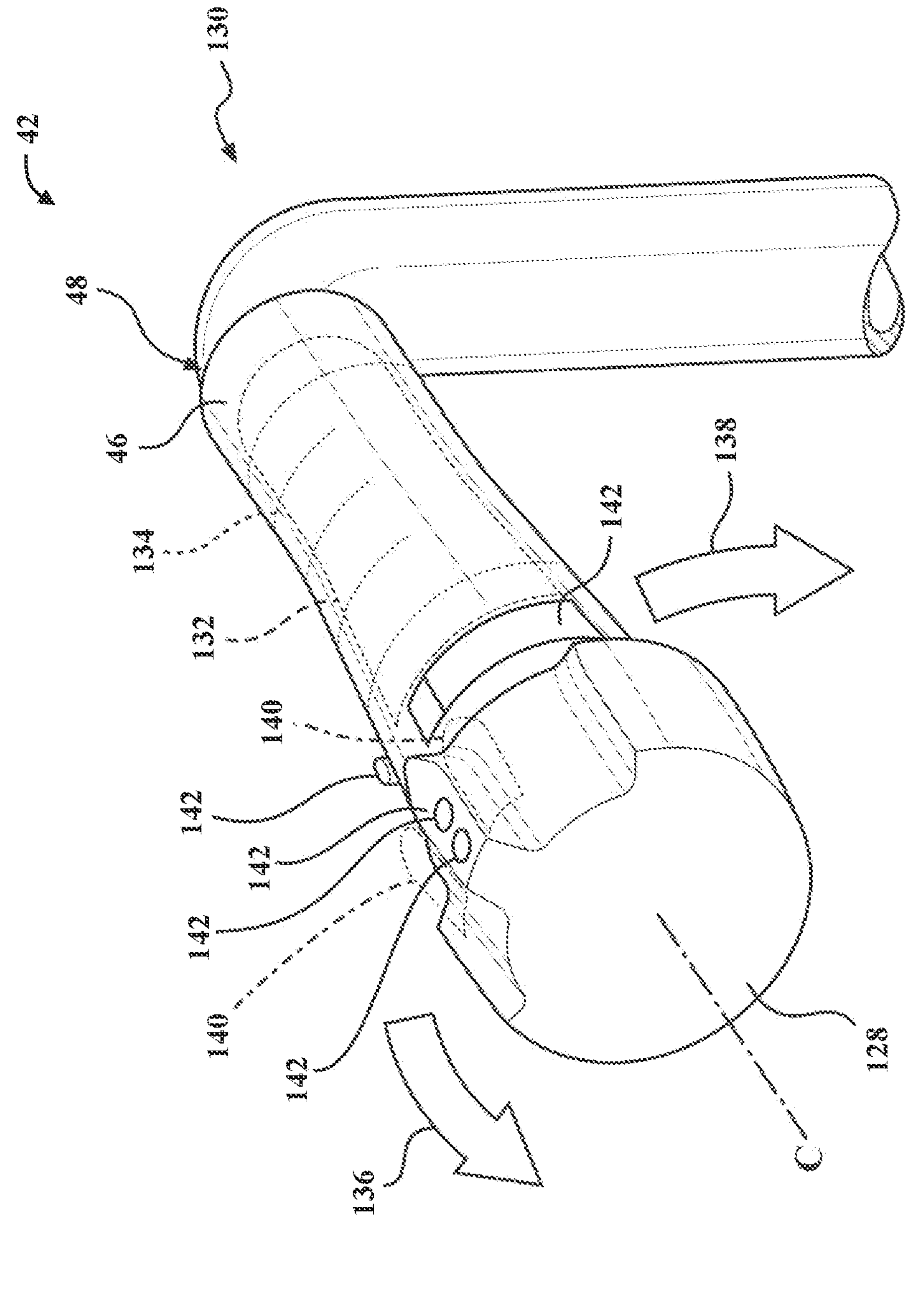
FIG. 6 is a perspective view of a handle and a throttle assembly that may be used with the patient support apparatus shown in FIG. 1.

In the version shown in FIG. 6, the auxiliary wheel drive system 78 is configured to drive (e.g. rotate) the auxiliary wheel 62 in response to a throttle 128 operable by the user. As is described in greater detail below in connection with FIGS. 6-7F, the throttle 128 is operatively attached to the first handle 42 in the illustrated version to define a throttle assembly 130.

Figure 7C:
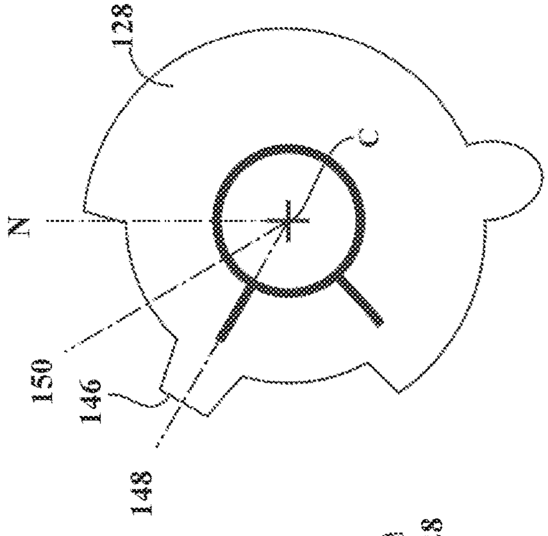
FIG. 7C is an elevational view of a third position of the throttle relative to the handle.
Figure 7F:
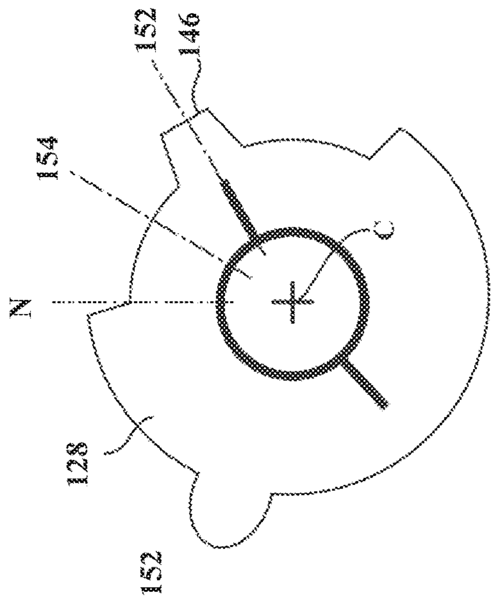
FIG. 7F is an elevational view of a fifth position of the throttle relative to the handle.
Figure 7B:
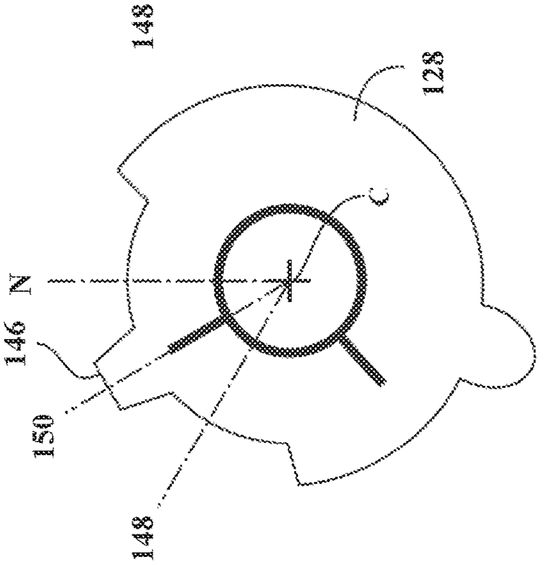
FIG. 7B is an elevational view of a second position of the throttle relative to the handle.
Figure 7E:
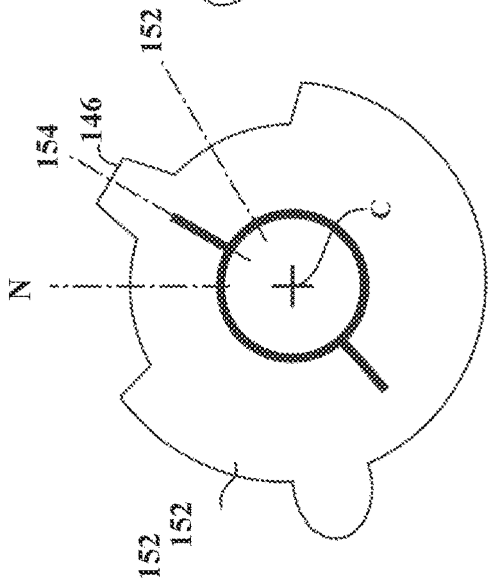
FIG. 7E is an elevational view of a fourth position of the throttle relative to the handle.

In some versions, such as those shown in FIGS. 6-7F, one or more user interface sensors 132 (e.g., capacitive sensors or the like) are coupled to the first handle 42 to determine engagement by the user and generate a signal responsive to touch (e.g. hand placement/contact) of the user. The one or more user interface sensors 132 are operatively coupled to the auxiliary wheel actuator 64 to control movement of the auxiliary wheel 62 between the deployed position 66 and the retracted position 68. Operation of the auxiliary wheel actuator 64 in response to the user interface sensor 132 is described in more detail below. In some versions, the user interface sensor 132 is coupled to another portion of the patient support apparatus 10, such as another user interface 40.

In some versions, such as is depicted in FIG. 6, engagement features or indicia 134 are located on the first handle 42 to indicate to the user where the user's hands may be placed on a particular portion of the first handle 42 for the user interface sensor 132 to generate the signal indicating engagement by the user. For instance, the first handle 42 may comprise embossed or indented features to indicate where the user's hand should be placed. In some versions, the indicia 134 comprises a film, cover, or ink disposed at least partially over the first handle 42 and shaped like a handprint to suggest the user's hand should match up with the handprint for the user interface sensor 132 to generate the signal. In still other versions, the shape of the user interface sensor 132 acts as the indicia 134 to indicate where the user's hand should be placed for the user interface sensor 132 to generate the signal. In some versions (not shown), the patient support apparatus 10 does not comprise a user interface sensor 132 operatively coupled to the auxiliary wheel actuator 64 for moving the auxiliary wheel 62 between the deployed position 66 and the retracted position 68. Instead, a user input device is operatively coupled to the auxiliary wheel actuator 64 for the user to selectively move the auxiliary wheel 62 between the deployed position 66 and the retracted position 68. In some versions, both the user interface sensor 132 and the user input device are employed.

Figure 7A:
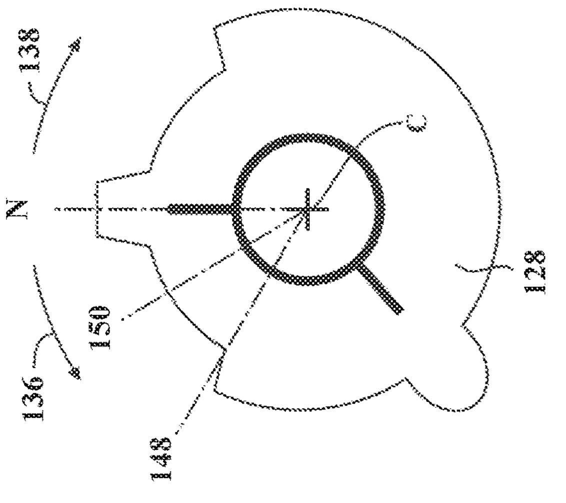
FIG. 7A is an elevational view of a first position of a throttle of the throttle assembly relative to the handle.
Figure 7D:
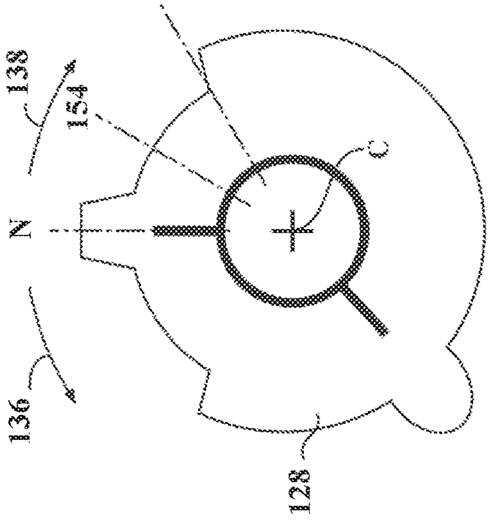
FIG. 7D is another elevational view of the first position of the throttle relative to the handle.

Referring now to FIGS. 7A-7F, the throttle 128 is illustrated in various positions. In FIGS. 7A and 7D, the throttle is in a neutral throttle position N. The throttle 128 is movable in a first direction 136 (also referred to as a "forward direction") relative to the neutral throttle position N and a second direction 138 (also referred to as a "backward direction") relative to the neutral throttle position N opposite the first direction 136. As will be appreciated from the subsequent description below, the auxiliary wheel drive system 78 drives the auxiliary wheel 62 in a forward direction when the throttle 128 is moved in the first direction 136, and in a rearward direction opposite the forward direction when the throttle 128 is moved in the second direction 138. When the throttle 128 is disposed in the neutral throttle position N, as shown in FIG. 7A (see also FIG. 7D), the auxiliary wheel drive system 78 does not drive the auxiliary wheel 62 in either direction. In many versions, the throttle 128 is spring-biased to the neutral throttle position N.

As is described in greater detail below, when the throttle 128 is in the neutral throttle position N, the auxiliary wheel drive system 78 may permit the auxiliary wheel 62 to be manually rotated as a result of a user pushing on the first handle 42 or another user interface 40 to push the patient support apparatus 10 in a desired direction. In other words, the motor 80 may be unbraked and capable of being driven manually.

It should be appreciated that the terms forward and backward are used to describe opposite directions that the auxiliary wheel 62 rotates to move the base 14 along the floor surface. For instance, forward refers to movement of the patient support apparatus 10 with the foot end leading and backward refers to the head end leading. In some versions, backward rotation moves the patient support apparatus 10 in the direction with the foot end leading and forward rotation moves the patient support apparatus 10 in the direction with the head end leading. In such versions, the handles 42, 44 may be located at the foot end.

Referring to FIG. 6, the location of the throttle 128 relative to the first handle 42 permits the user to simultaneously grasp the handle body 48 of the first handle 42 and rotate the throttle 128 about the central axis C defined by the inner support 46. This allows the user interface sensor 132, which is operatively attached to the handle body 48 in the illustrated version, to generate the signal responsive to touch by the user while the user moves the throttle 128. In some versions, the throttle 128 comprises one or more throttle interfaces (e.g., ridges, raised surfaces, grip portions, etc.) for assisting the user with rotating the throttle 128.

In some versions, the throttle assembly 130 may comprise one or more auxiliary user interface sensors 140 (shown in phantom), in addition to the user interface sensor 132, to determine engagement by the user. In the version illustrated in FIG. 6, the auxiliary user interface sensors 140 are realized as throttle interface sensors respectively coupled to each of the throttle interfaces and operatively coupled to the auxiliary wheel drive system 78 (e.g., via electrical communication). The throttle interface sensors are likewise configured to determine engagement by the user and generate a signal responsive to touch of the user's thumb and/or fingers. When the user is touching one or more of the throttle interfaces, the throttle interface sensors generate a signal indicating the user is currently touching one or more of the throttle interfaces and movement of the throttle 128 is permitted to cause rotation of the auxiliary wheel 62. When the user is not touching any of the throttle interfaces, the throttle interface sensors generate a signal indicating an absence of the user's thumb and/or fingers on the throttle interfaces and movement of the throttle 128 is restricted from causing rotation of the auxiliary wheel 62. The throttle interface sensors mitigate the chances for inadvertent contact with the throttle 128 to unintentionally cause rotation of the auxiliary wheel 62. The throttle interface sensors may be absent in some versions. As is described in greater detail below in connection with FIG. 6, other types of auxiliary user interface sensors 140 are contemplated by the present disclosure besides the throttle interface sensors described above. Furthermore, it will be appreciated that certain versions may comprise both the user interface sensor 132 and the auxiliary user interface sensor 140 (e.g., one or more throttle interface sensors), whereas some versions may comprise only one of either the user interface sensor 132 and the auxiliary user interface sensor 140. Various visual indicators 142 (e.g., LEDs, displays, illuminated surfaces, etc.) may also be present on the throttle 128 or the handle body 48 to indicate a current operational mode, speed, state (deployed/retracted), condition, etc. of the auxiliary wheel assembly 60. Other configurations are contemplated.

Referring again to FIGS. 7A-7F, various positions of the throttle 128 are shown. The throttle 128 is movable relative to the first handle 42 to a first throttle position, a second throttle position, and intermediate throttle positions therebetween. The throttle 128 is operable between the first throttle position and the second throttle position to adjust the rotational speed of the auxiliary wheel.

In some versions, the first throttle position corresponds with the neutral throttle position N (shown in FIGS. 7A and 7D) and the auxiliary wheel 62 is at rest. The second throttle position corresponds with a maximum forward throttle position 148 (shown in FIG. 7C) of the throttle 128 moved in the first direction 136. One intermediate throttle position corresponds with an intermediate forward throttle position 150 (shown FIG. 7B) of the throttle 128 between the neutral throttle position N and the maximum forward throttle position 148. Here, both the maximum forward throttle position 148 and the intermediate forward throttle position 150 may also be referred to as forward throttle positions.

In other cases, the second throttle position corresponds with a maximum backward throttle position 152 (shown in FIG. 7F) of the throttle 128 moved in the second direction 138. Here, one intermediate throttle position corresponds with an intermediate backward throttle position 154 (shown in FIG. 7E) of the throttle 128 between the neutral throttle position N and the maximum backward throttle position 152. Here, both the maximum backward throttle position 152 and the intermediate backward throttle position 154 may also be referred to as backward throttle positions.

In the versions shown, the throttle 128 is movable from the neutral throttle position N to one or more operating throttle positions 146 between, and including, the maximum backward throttle position 152 and the maximum forward throttle position 148, including a plurality of forward throttle positions between the neutral throttle position N and the maximum forward throttle position 148 as well as a plurality of backward throttle positions between the neutral throttle position N and the maximum backward throttle position 152. The configuration of the throttle 128 and the throttle assembly 130 will be described in greater detail below.

Figure 8:
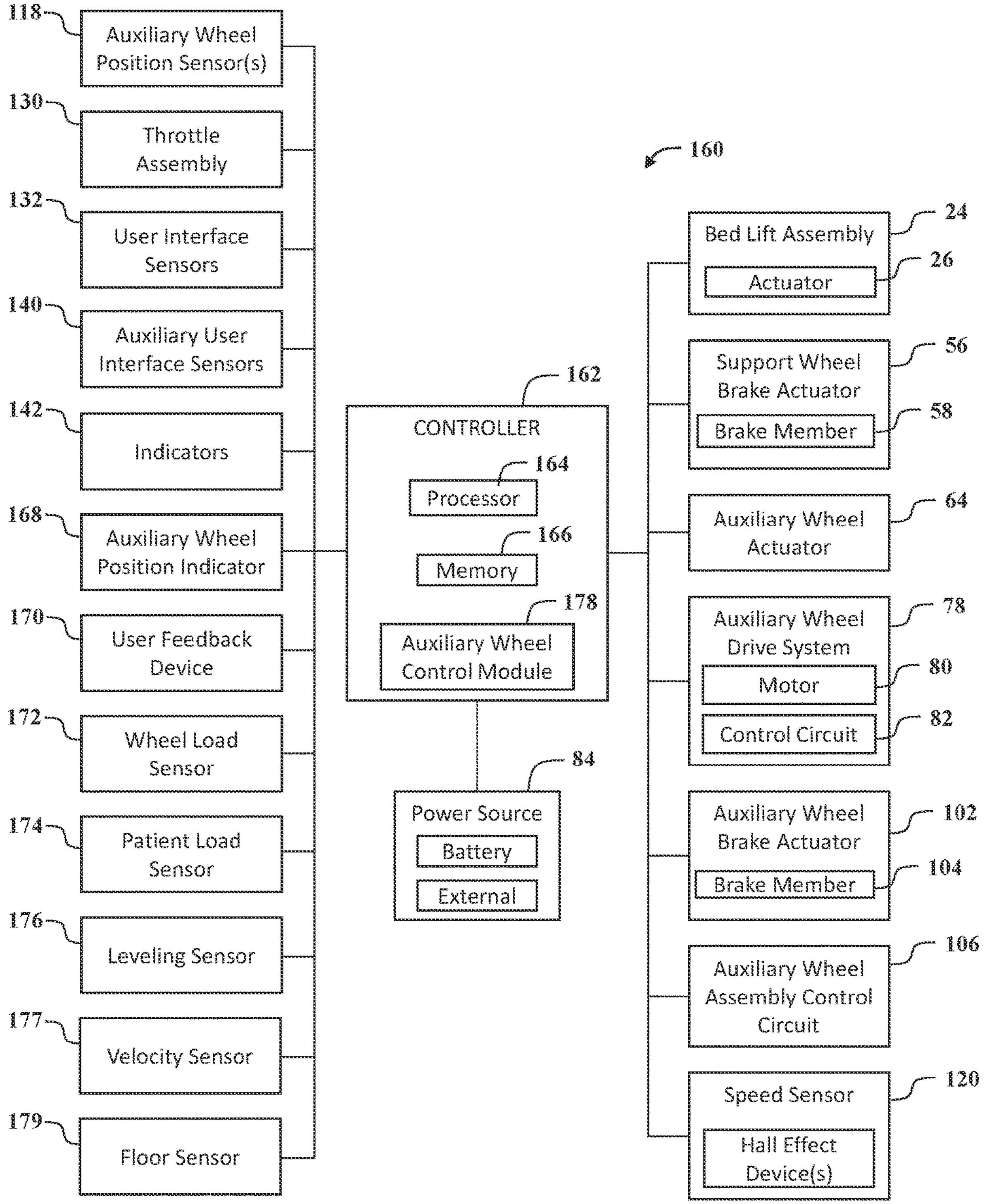
FIG. 8 is a schematic view of a control system of the patient support apparatus shown in FIG. 1.

FIG. 8 illustrates a control system 160 of the patient support apparatus 10. The control system 160 comprises a controller 162 coupled to, among other components, the user interface sensors 132, the throttle assembly 130, the auxiliary interface sensors 140, the auxiliary wheel assembly control circuit 106, the auxiliary wheel actuator 64, the auxiliary wheel drive system 78, the support wheel brake actuator 56, the auxiliary wheel brake actuator 102, and the lift assembly 24.

The controller 162 is configured to operate the auxiliary wheel actuator 64 and the auxiliary wheel drive system 78. The controller 162 may also be configured to operate the support wheel brake actuator 56, the bed lift actuator 26 to operate the lift assembly 24, and the auxiliary wheel brake actuator 102. The controller 162 is generally configured to detect the signals from the sensors and may be further configured to operate the auxiliary wheel actuator 64 responsive to the user interface sensor 132 generating signals responsive to touch.

The controller 162 comprises one or more microprocessors 164 that are coupled to a memory device 166. The memory device 166 may be any memory device suitable for storage of data and computer-readable instructions. For example, the memory device 166 may be a local memory, an external memory, or a cloud-based memory embodied as random access memory (RAM), non-volatile RAM (NVRAM), flash memory, or any other suitable form of memory.

The one or more microprocessors 164 are programmed for processing instructions or for processing algorithms stored in memory 166 to control operation of patient support apparatus 10. For example, the one or more microprocessors 164 may be programmed to control the operation of the auxiliary wheel assembly 60, the support wheel brake actuator 56, and the lift assembly 24 based on user input received via the user interfaces 40. Additionally or alternatively, the controller 162 may comprise one or more microcontrollers, field programmable gate arrays, systems on a chip, discrete circuitry, and/or other suitable hardware, software, or firmware that is capable of carrying out the functions described herein. For example, in some versions, the instructions and/or algorithms executed by the controller 162 may be performed in a state machine configured to execute the instructions and/or algorithms. The controller 162 may be carried on-board the patient support apparatus 10, or may be remotely located. In some versions, the controller 162 may be mounted to the base 14.

The controller 162 comprises an internal clock to keep track of time. In some versions, the internal clock may be realized as a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both.

In some versions, the memory 166, microprocessors 164, and microcontroller clock cooperate to send signals to and operate the lift assembly 24 and the auxiliary wheel assembly 60 to meet predetermined timing parameters. These predetermined timing parameters are discussed in more detail below and are referred to as predetermined durations.

The controller 162 may comprise one or more subcontrollers configured to control the lift assembly 24 and the auxiliary wheel assembly 60, or one or more subcontrollers for each of the actuators 26, 56, 64, 102, or the auxiliary wheel drive system 78. In some cases, one of the subcontrollers may be attached to the intermediate frame 16 with another attached to the base 14. Power to the actuators 26, 56, 64, 102, the auxiliary wheel drive system 78, and/or the controller 162 may be provided by a battery power supply.

The controller 162 may communicate with auxiliary wheel assembly control circuit 106, the actuators 26, 56, 64, 102, and the auxiliary wheel drive system 78 via wired or wireless connections. The controller 162 generates and transmits control signals to the auxiliary wheel assembly control circuit 106, the actuators 26, 56, 64, 102, and the auxiliary wheel drive system 78, or components thereof, to operate the auxiliary wheel assembly 60 and lift assembly 24 to perform one or more desired functions.

In some versions, and as is shown in FIG. 8, the control system 160 comprises an auxiliary wheel position indicator 168 to display a current position of the auxiliary wheel 62 between or at the deployed position 66 and the retracted position 68, and the one or more intermediate positions. In some versions, the auxiliary wheel position indicator 168 comprises a light bar that lights up completely when the auxiliary wheel 62 is in the deployed position 66 to indicate to the user that the auxiliary wheel 62 is ready to be driven. Likewise, the light bar may be partially lit up when the auxiliary wheel 62 is in a partially retracted position and the light bar may be devoid of light when the auxiliary wheel 62 is in the fully retracted position 68. Other visualization schemes are possible to indicate the current position of the auxiliary wheel 62 to the user, such as other graphical displays, text displays, and the like. Such light indicators or displays are coupled to the controller 162 to be controlled by the controller 162 based on the detected position of the auxiliary wheel 62 as described below. Such indicators may be located on the handle 42 or any other suitable location.

In the illustrated version, the control system 160 comprises a user feedback device 170 coupled to the controller 162 to indicate to the user one of a current speed, a current range of speeds, a current throttle position, and a current range of throttle positions. The user feedback device 170 may be similar to the visual indicators 142 described above, and also provide feedback regarding a current operational mode, current state, condition, etc. of the auxiliary wheel assembly 60. The user feedback device 170 may be placed at any suitable location on the patient support apparatus 10. In some versions, the user feedback device 170 comprises one of a visual indicator, an audible indicator, and a tactile indicator.

The actuators 26, 56, 64, 102 and the auxiliary wheel drive system 78 described above may comprise one or more of an electric actuator, a hydraulic actuator, a pneumatic actuator, combinations thereof, or any other suitable types of actuators, and each actuator may comprise more than one actuation mechanism. The actuators 26, 56, 64, 102 and the auxiliary wheel drive system 78 may comprise one or more of a rotary actuator, a linear actuator, or any other suitable actuators. The actuators 26, 56, 64, 102 and the auxiliary wheel drive system 78 may comprise reversible DC motors, or other types of motors. A suitable actuator for the auxiliary wheel actuator 64 comprises a linear actuator supplied by LINAK A/S located at Smedevenget 8, Guderup, DK-6430, Nordborg, Denmark. It is contemplated that any suitable actuator capable of deploying the auxiliary wheel 62 may be utilized.

The controller 162 is generally configured to operate the auxiliary wheel actuator 64 to move the auxiliary wheel 62 to the deployed position 66 responsive to detection of the signal from the user interface sensor 132. When the user touches the first handle 42, the user interface sensor 132 generates a signal indicating the user is touching the first handle 42 and the controller operates the auxiliary wheel actuator 64 to move the auxiliary wheel 62 to the deployed position 66. In some versions, the controller 162 is further configured to operate the auxiliary wheel actuator 64 to move the auxiliary wheel 62 to the retracted position 68 responsive to the user interface sensor 132 generating a signal indicating the absence of the user touching the first handle 42.

In some versions, the controller 162 is configured to operate the auxiliary wheel actuator 64 to move the auxiliary wheel 62 to the deployed position 66 responsive to detection of the signal from the user interface sensor 132 indicating the user is touching the first handle 42 for a first predetermined duration greater than zero seconds. Delaying operation of auxiliary wheel actuator 64 for the first predetermined duration after the controller 162 detects the signal from the sensor 132 indicating the user is touching the first handle 42 mitigates chances for inadvertent contact to result in operation of the auxiliary wheel actuator 64. In some versions, the controller 162 is configured to initiate operation of the auxiliary wheel actuator 64 to move the auxiliary wheel 62 to the deployed position 66 immediately after (e.g., less than 1 second after) the user interface sensor 132 generates the signal indicating the user is touching the first handle 42.

In some versions, the controller 162 is further configured to operate the auxiliary wheel actuator 64 to move the auxiliary wheel 62 to the retracted position 68, or to the one or more intermediate positions, responsive to the user interface sensor 132 generating a signal indicating the absence of the user touching the first handle 42. In some versions, the controller 162 is configured to operate the auxiliary wheel actuator 64 to move the auxiliary wheel 62 to the retracted position 68, or to the one or more intermediate positions, responsive to the user interface sensor 132 generating the signal indicating the absence of the user touching the first handle 42 for a predetermined duration greater than zero seconds. In some versions, the controller 162 is configured to initiate operation of the auxiliary wheel actuator 64 to move the auxiliary wheel 62 to the retracted position 68, or to the one or more intermediate positions, immediately after (e.g., less than 1 second after) the user interface sensor 132 generates the signal indicating the absence of the user touching the first handle 42.

In versions including the support wheel brake actuator 56 and/or the auxiliary wheel brake actuator 102, the controller 162 may also be configured to operate one or both brake actuators 56, 102 to move their respective brake members 58, 104 between the braked position and the released position. In some versions, the controller 162 is configured to operate one or both brake actuators 56, 102 to move their respective brake members 58, 104 to the braked position responsive to the user interface sensor 132 generating the signal indicating the absence of the user touching the first handle 42 for a predetermined duration. In some versions, the predetermined duration for moving brake members 58, 104 to the braked position is greater than zero seconds. In some versions, the controller 162 is configured to initiate operation of one or both brake actuators 56, 102 to move their respective brake members 58, 104 to the braked position immediately after (e.g., less than 1 second after) the user interface sensor 132 generates the signal indicating the absence of the user touching the first handle 42.

The controller 162 is configured to operate one or both brake actuators 56, 102 to move their respective brake members 58, 104 to the released position responsive to the user interface sensor 132 generating the signal indicating the user is touching the first handle 42 for a predetermined duration. In some versions, the predetermined duration for moving brake members 58, 104 to the released position is greater than zero seconds. In some versions, the controller 162 is configured to initiate operation of one or both brake actuators 56, 102 to move their respective brake members 58, 104 to the released position immediately after (e.g., less than 1 second after) the user interface sensor 132 generates the signal indicating the user is touching the first handle 42.

In some versions, the auxiliary wheel position sensor 118 (also referred to as a "position sensor") is coupled to the controller 162 and generates signals detected by the controller 162. The auxiliary wheel position sensor 118 is coupled to the controller 162 and the controller 162 is configured to detect the signals from the auxiliary wheel position sensor 118 to detect positions of the auxiliary wheel 62 as the auxiliary wheel 62 moves between the deployed position 66, the one or more intermediate positions, and the retracted position 68.

In some versions, the controller 162 is configured to operate one or both brake actuators 56, 102 to move their respective brake members 58, 104 to the released position responsive to detection of the auxiliary wheel 62 being in the deployed position 66. In some versions, the controller 162 is configured to operate one or both brake actuators 56, 102 to move their respective brake members 58, 104 to the released position responsive to detection of the auxiliary wheel 62 being in a position between the deployed position 66 and the retracted position 68 (e.g., the one or more intermediate positions).

In some versions, an auxiliary wheel load sensor 172 is coupled to the auxiliary wheel 62 and the controller 162, with the auxiliary wheel load sensor 172 configured to generate a signal responsive to a force of the auxiliary wheel 62 being applied to the floor surface. In some versions, the auxiliary wheel load sensor 172 is coupled to the axle of the auxiliary wheel 62. The controller 162 is configured to detect the signal from the auxiliary wheel load sensor 172 and, in some versions, is configured to operate the auxiliary wheel drive system 78 to drive the auxiliary wheel 62 and move the base 14 relative to the floor surface responsive to the controller 162 detecting signals from the auxiliary wheel load sensor 172 indicating the auxiliary wheel 62 is in the partially deployed position engaging the floor surface when a force of the auxiliary wheel 62 on the floor surface exceeds an auxiliary wheel load threshold. This allows the user to drive the auxiliary wheel 62 before the auxiliary wheel 62 reaches the fully deployed position without the auxiliary wheel 62 slipping against the floor surface.

In some versions, a patient load sensor 174 is coupled to the controller 162 and to one of the base 14 and the intermediate frame 16. The patient load sensor 174 generates a signal responsive to weight, such as a patient being disposed on the base 14 and/or the intermediate frame 16. The controller 162 is configured to detect the signal from the patient load sensor 174. Here, the auxiliary wheel load threshold may change based on detection of the signal generated by the patient load sensor 174 to compensate for changes in weight disposed on the intermediate frame 16 and/or the base 14 to mitigate probability of the auxiliary wheel 62 slipping when the controller 162 operates the auxiliary wheel drive system 78.

In some versions, a patient support apparatus leveling sensor 176 is coupled to the controller 162 and to one of the base 14 and the intermediate frame 16. The leveling sensor 176 generates a signal responsive to the horizontal orientation of the base 14. The controller 162 is configured to detect the horizontal orientation of the patient support apparatus 10 based on signals received from the leveling sensor 176 and determine whether the patient support apparatus 10 is positioned on a ramp, an inclined floor surface, a declined floor surface, and/or a substantially flat floor surface.

In some versions, a velocity sensor 177 is coupled to the controller 162 and to one of the base 14 and the intermediate frame 16. In some configurations, the velocity sensor 177 may be wheel speed sensor 120 or a separate sensor. The velocity sensor 177 generates a signal indicative of the rate and amplitude of travel of the patient support apparatus 10 relative to the floor surface. In various configurations, the velocity sensor 177 may sense actual speed of the patient support apparatus 10, changes in commanded speed of the patient support apparatus 10, and/or ground speed.

In some versions, a floor sensor 179 is coupled to the controller 162 and is operatively attached to the support structure 12 to determine a distance to the floor surface 220. In some versions, the floor sensor 179 is configured as a discrete component that is coupled to the base 14 to determine the distance to the floor surface 220 from a position adjacent to the drive member 62 (e.g., an ultrasonic distance sensor). In some versions, the floor sensor 179 may be realized as a "feeler" wheel/roller arranged at a leading edge ahead of support wheels 50 and/or at a trailing edge behind support wheels 50 which engages against and moves relative to the base 14 in response to changes in the floor surface 220 (e.g., when approaching an incline or a flat surface). In some versions, the floor sensor 179 could be defined by the wheel position sensor 118. Other configurations are contemplated.

Each of the sensors described above may comprise one or more of a force sensor, a load cell, a speed radar, an optical sensor, an electromagnetic sensor, an accelerometer, a potentiometer, an infrared sensor, a capacitive sensor, an ultrasonic sensor, a limit switch, a level sensor, a 3-Axis orientation sensor, or any other suitable sensor for performing the functions recited herein. Other configurations are contemplated.

In the illustrated versions, where the auxiliary wheel drive system 78 comprises the motor 80 and the gear train 94, the controller 162 is configured to operate the motor 80 to drive the auxiliary wheel 62 and move the base 14 relative to the floor surface responsive to detection of the auxiliary wheel 62 being in the at least partially deployed position as detected by virtue of the controller 162 detecting the motor 80 drawing electrical power from the power source 84 above an auxiliary wheel power threshold, such as by detecting a change in current draw of the motor 80 associated with the auxiliary wheel 62 being in contact with the floor surface. In this case, detection of the current drawn by the motor 80 being above a threshold operates as a form of auxiliary wheel load sensor 172.

In some versions, when power is not supplied to the motor 80 from the power source 84, the motor 80 acts as a brake to decelerate the auxiliary wheel 62 through the gear train 94. In some versions, the auxiliary wheel 62 is permitted to rotate relatively freely when power is not supplied to the motor 80.

The controller 162 may be programmed to execute the algorithms operating the auxiliary wheel assembly 60 in a plurality of operating modes, as described in U.S. patent application Ser. No. 17/131,947, filed on Dec. 23, 2020, entitled, "Patient Transport Apparatus With Controlled Auxiliary Wheel Speed," which is hereby incorporated herein by reference. For example, the controller 162 may be programmed to operate the auxiliary wheel assembly 60 in a drive mode, a free wheel mode, a coast mode, a free wheel speed limiting mode, and a drag mode. The controller 162 may also be programmed to quickly turn the modes on/off and quickly toggle between modes in certain scenarios.

The controller 162 may additionally be programmed to detect a position of the throttle assembly 130 determine a desired rotational speed value associated with a current operating throttle position, determine a current rotational speed of the auxiliary wheel 62, select an acceleration rate based on the current rotational speed of the auxiliary wheel 62, generate an output signal based on the selected acceleration rate, and transmit the generated output signal to the motor control circuit 82 to operate the motor 80 to rotate the auxiliary wheel 62 at the selected acceleration rate, as described in U.S. patent application Ser. No. 17/132,009, filed on Dec. 23, 2020, entitled, "Patient Transport Apparatus With Auxiliary Wheel Control Systems," which is hereby incorporated herein by reference.

Figure 11:
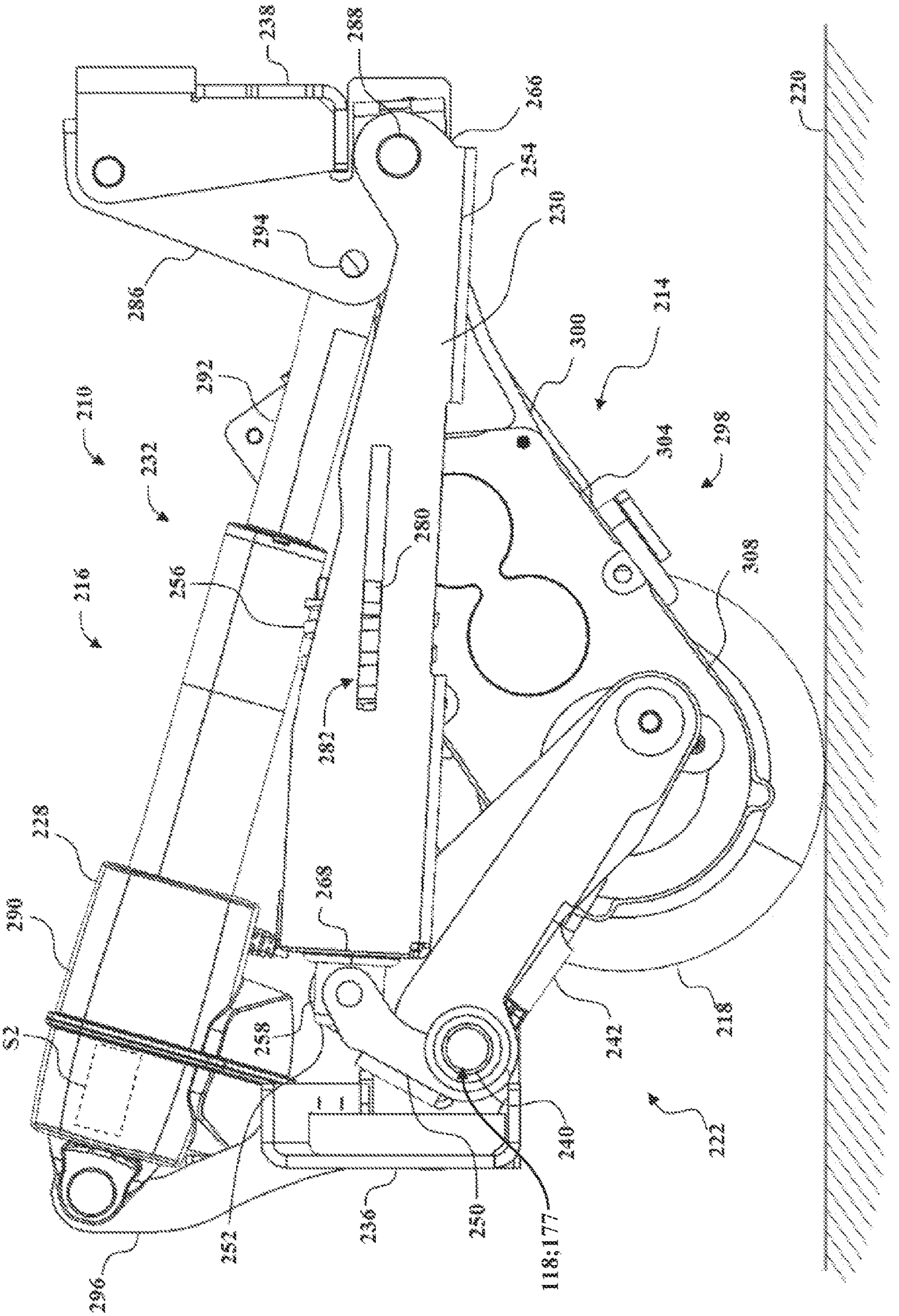
FIG. 11 is an elevation view of the auxiliary wheel assembly shown in FIG. 2, according to an alternative version.

Referring to FIG. 11, an elevation view of the auxiliary wheel assembly shown in FIG. 2 is shown, according to an alternative version. In the versions shown, the base 14 includes a support assembly 200 that includes a forward support member 202, a rear support member 204, and a pair of opposing side support members 206, 208. The side support members 206, 208 extend between the forward support member 202 and the rear support member 204 and are orientated parallel to the longitudinal axis 18.

Referring to FIGS. 11-17C, an auxiliary wheel system 210 is coupled to the base 14. The auxiliary wheel system 210 influences motion of the patient support apparatus 10 during transportation over the floor surface.

Referring to FIGS. 2 and 11, the auxiliary wheel system 210 includes a support frame 212 that is coupled to the base 14, an auxiliary wheel assembly 214 that is coupled to the support frame 212 and arranged to articulate (e.g. pivot) with respect to the support frame 212, and an actuator assembly 216 that is coupled the support frame 212 and the auxiliary wheel assembly 214. The auxiliary wheel assembly 214 includes an auxiliary wheel 218 that is configured to influence motion of the patient support apparatus 10 over a floor surface 220. The auxiliary wheel assembly 214 is positionable to a deployed position 222 (shown in FIG. 16A) with the auxiliary wheel 218 engaging the floor surface 220, and a stowed position 224 (shown in FIG. 16B) with the auxiliary wheel 218 spaced a vertical distance 226 from the floor surface 220. The actuator assembly 216 is coupled to the support frame 212 and to the auxiliary wheel assembly 214.

Referring to FIGS. 11, 12, 13, and 14, the actuator assembly 216 includes a lift actuator 228 and a spring cartridge assembly 230. The lift actuator 228 is operable to move the auxiliary wheel 218 to the deployed position 222 engaging the floor surface and to the stowed position 224 spaced away from and out of contact with the floor surface. The spring cartridge assembly 230 is coupled between the lift actuator 228 and the auxiliary wheel 218, and is configured to transfer a force from the lift actuator 228 to the auxiliary wheel 218 to facilitate moving the auxiliary wheel 218 to the deployed position 222 and to the stowed position 224. In addition, the spring cartridge assembly 230 is configured to bias the auxiliary wheel 218 outwardly from the support frame 212 and towards the deployed position 222, and to allow a vertical movement of auxiliary wheel 218 with respect to the support frame 212 with the auxiliary wheel assembly 214 in the deployed position 222.

Figure 16A:
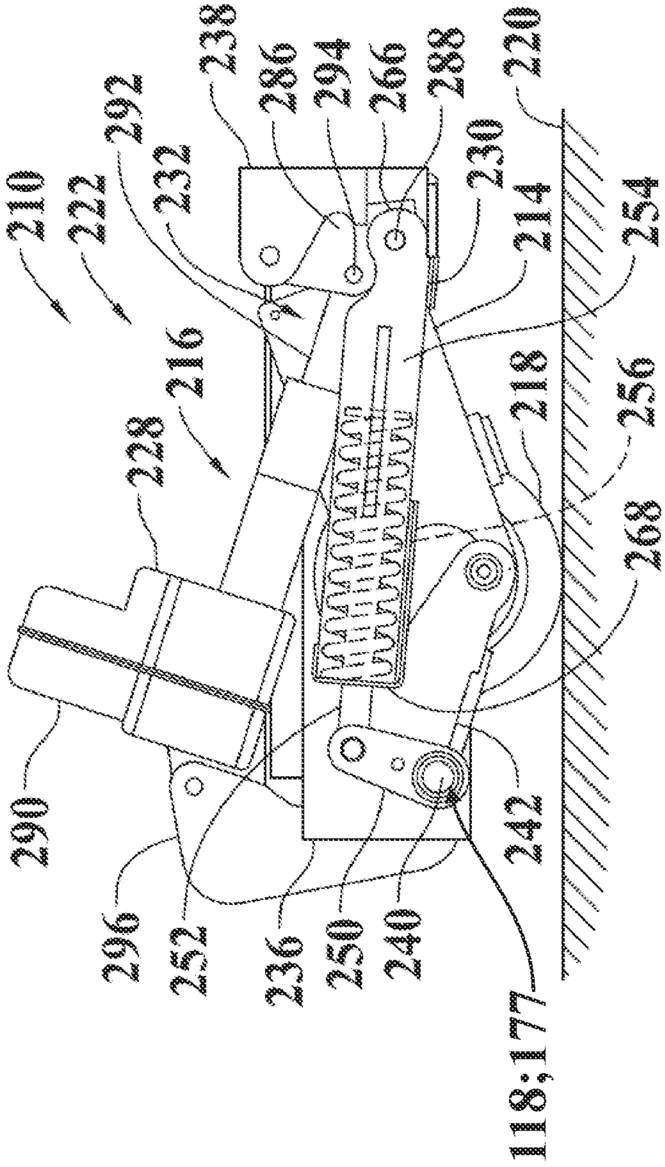
FIG. 16A is an elevation view of the auxiliary wheel assembly shown in FIG. 11 in a deployed position.
Figure 16B:
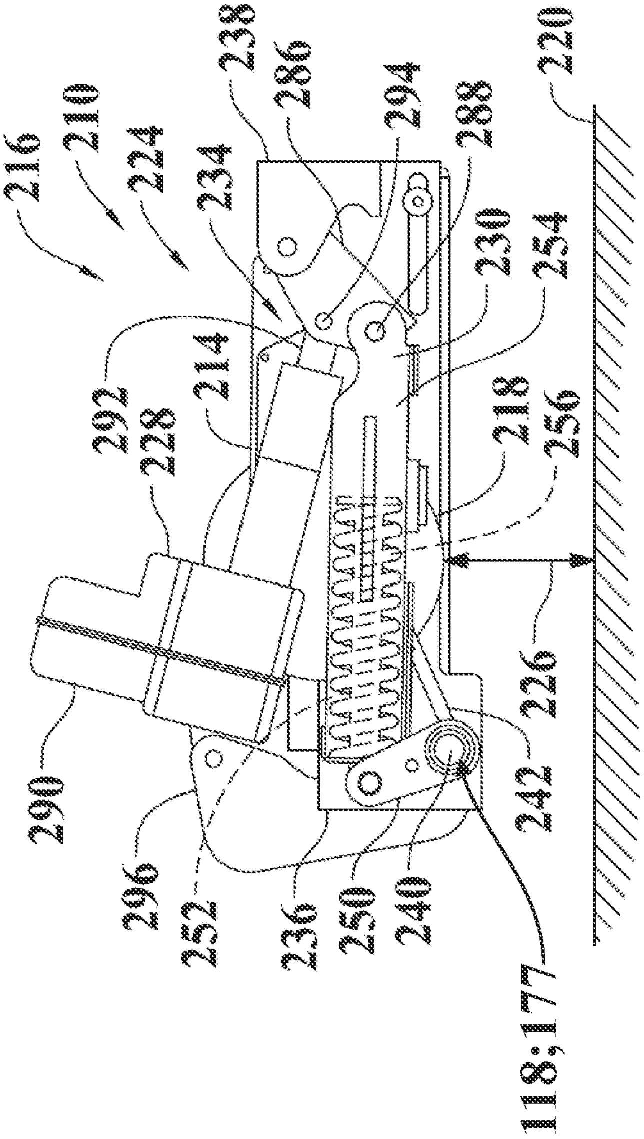
FIG. 16B is an elevation view of the auxiliary wheel assembly shown in FIG. 11 in a stowed position.

In the versions shown, the lift actuator 228 is positionable between an extended position 232 (shown in Figurel6A) and a retracted position 234 (shown in FIG. 16B). For example, a movement of the lift actuator 228 towards the extended position 232 causes the spring cartridge assembly 230 to move the auxiliary wheel 218 towards the deployed position 222. A movement of the lift actuator 228 towards the retracted position 234 causes the spring cartridge assembly 230 to move the auxiliary wheel 218 towards the stowed position 224. In addition, the spring cartridge assembly 230 is configured to allow vertical movement of the auxiliary wheel 218 with the lift actuator 228 in the extended position 232.

The auxiliary wheel 218 influences motion of the patient support apparatus 10 during transportation over the floor surface when the auxiliary wheel 218 is in the deployed position 222. In some versions, the auxiliary wheel assembly 214 comprises an additional auxiliary wheel movable with the auxiliary wheel 218 between the deployed position 222 and stowed position 224 via the actuator assembly 216.

By deploying the auxiliary wheel 218 on the floor surface, the patient support apparatus 10 can be easily moved down long, straight hallways or around corners, owing to a non-swiveling nature of the auxiliary wheel 218. When the auxiliary wheel 218 is stowed (see FIG. 16B), the patient support apparatus 10 is subject to moving in an undesired direction due to uncontrollable swiveling of the support wheels 50. For instance, during movement down long, straight hallways, the patient support apparatus 10 may be susceptible to "dog tracking," which refers to undesirable sideways movement of the patient support apparatus 10. Additionally, when cornering, without the auxiliary wheel 218 deployed, and with all of the support wheels 50 able to swivel, there is no wheel assisting with steering through the corner, unless one or more of the support wheels 50 are provided with steer lock capability and the steer lock is activated.

The auxiliary wheel 218 may be arranged parallel to the longitudinal axis 18 of the base 14. Said differently, the auxiliary wheel 218 rotates about a rotational axis R (see FIG. 11) oriented perpendicularly to the longitudinal axis 18 of the base 14 (albeit offset in some cases from the longitudinal axis 18). In the versions shown, the auxiliary wheel 218 is incapable of swiveling about a swivel axis. In other versions, the auxiliary wheel 218 may be capable of swiveling, but can be locked in a steer lock position in which the auxiliary wheel 218 is locked to solely rotate about the rotational axis R oriented perpendicularly to the longitudinal axis 18. In still other versions, the auxiliary wheel 218 may be able to freely swivel without any steer lock functionality.

The auxiliary wheel 218 may be located to be deployed inside a perimeter of the base 14 and/or within a support wheel perimeter defined by the swivel axes 52 of the support wheels 50. In some versions, such as those employing a single auxiliary wheel 218, the auxiliary wheel 218 may be located near a center of the support wheel perimeter, or offset from the center. In this case, the auxiliary wheel 218 may also be referred to as a fifth wheel. In other versions, the auxiliary wheel 218 may be disposed along the support wheel perimeter or outside of the support wheel perimeter. In the versions shown, the auxiliary wheel 218 has a diameter larger than a diameter of the support wheels 50. In other versions, the auxiliary wheel 218 may have the same or a smaller diameter than the support wheels 50.

As the patient support apparatus 10 travels over an uneven floor surface, the spring cartridge assembly 230 allows the auxiliary wheel 218 to move vertically with respect to base 14, and biases the auxiliary wheel 218 towards the floor surface with sufficient force to maintain traction between the floor surface and the auxiliary wheel 218. In addition, the spring cartridge assembly 230 permits the auxiliary wheel 218 to move upward when encountering a high spot in the floor surface and to dip lower when encountering a low spot in the floor surface.

Figure 17A:
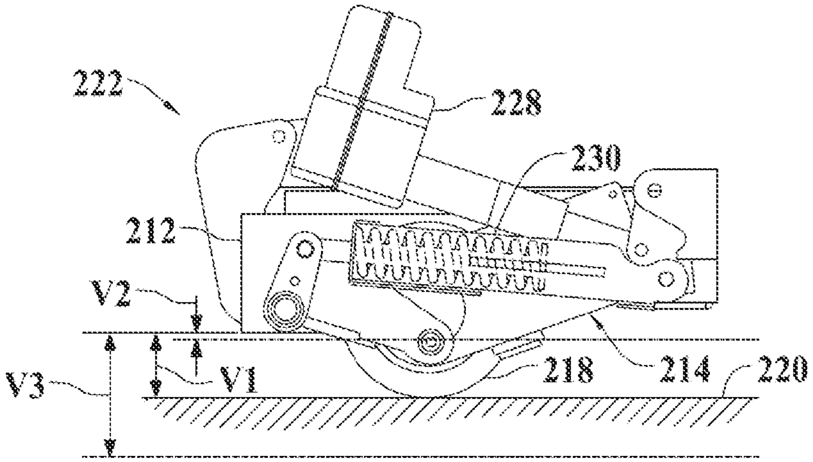
FIGS. 17A-17C are elevation views illustrating a movement of the auxiliary wheel with the auxiliary wheel assembly shown in FIG. 11 in the deployed position.
Figure 17B:
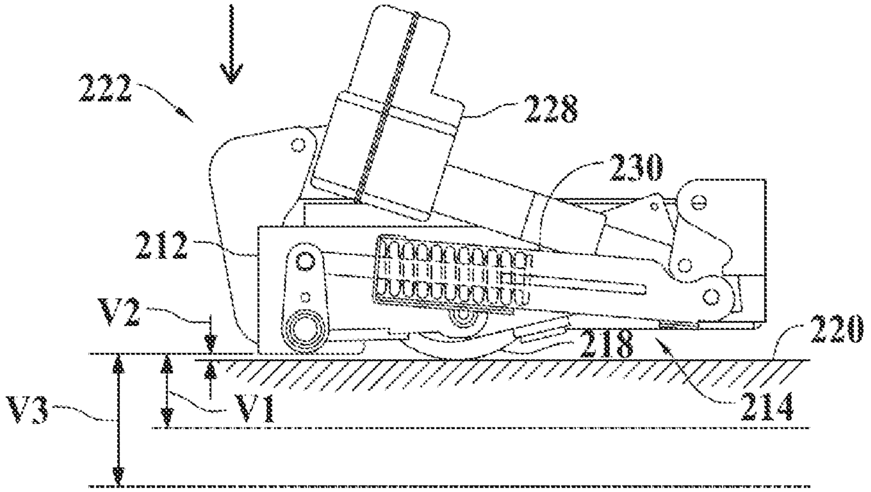
Figure 17C:
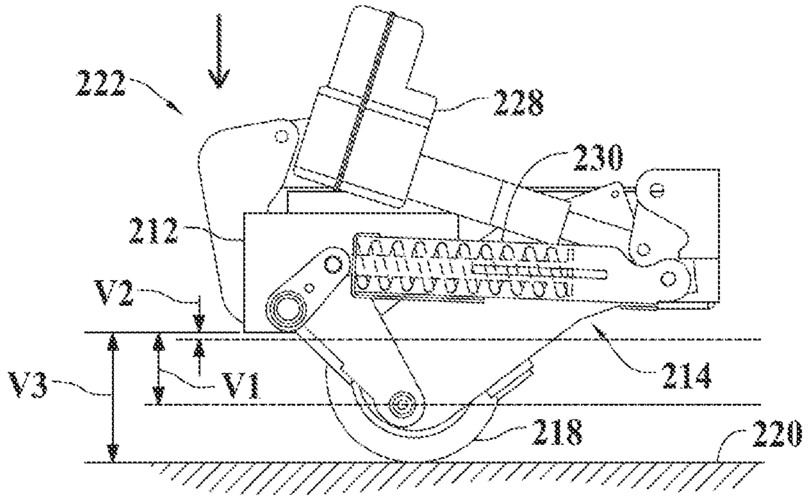
Figure 20A:
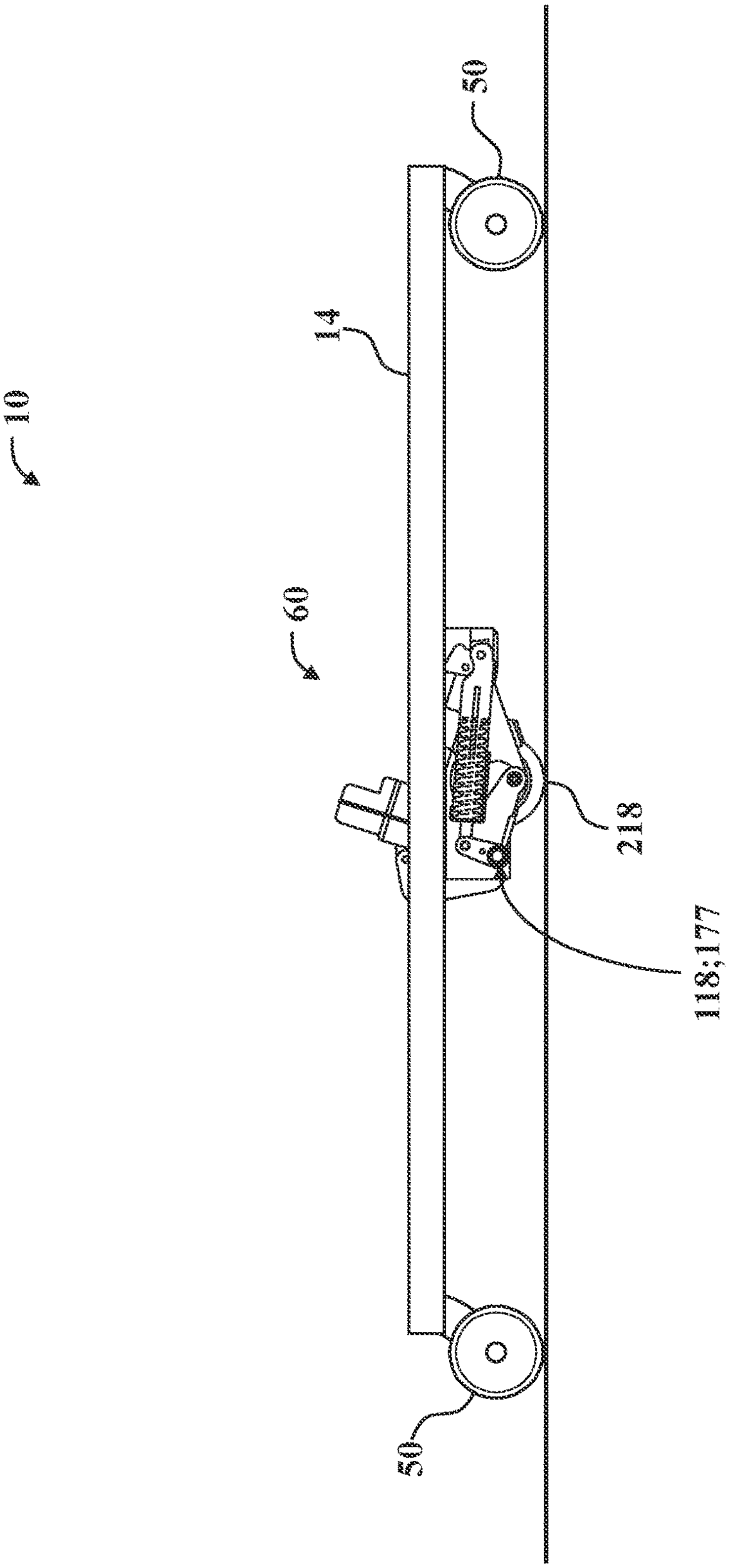
FIG. 20A is an elevation views illustrating operation along a flat surface.
Figure 20B:
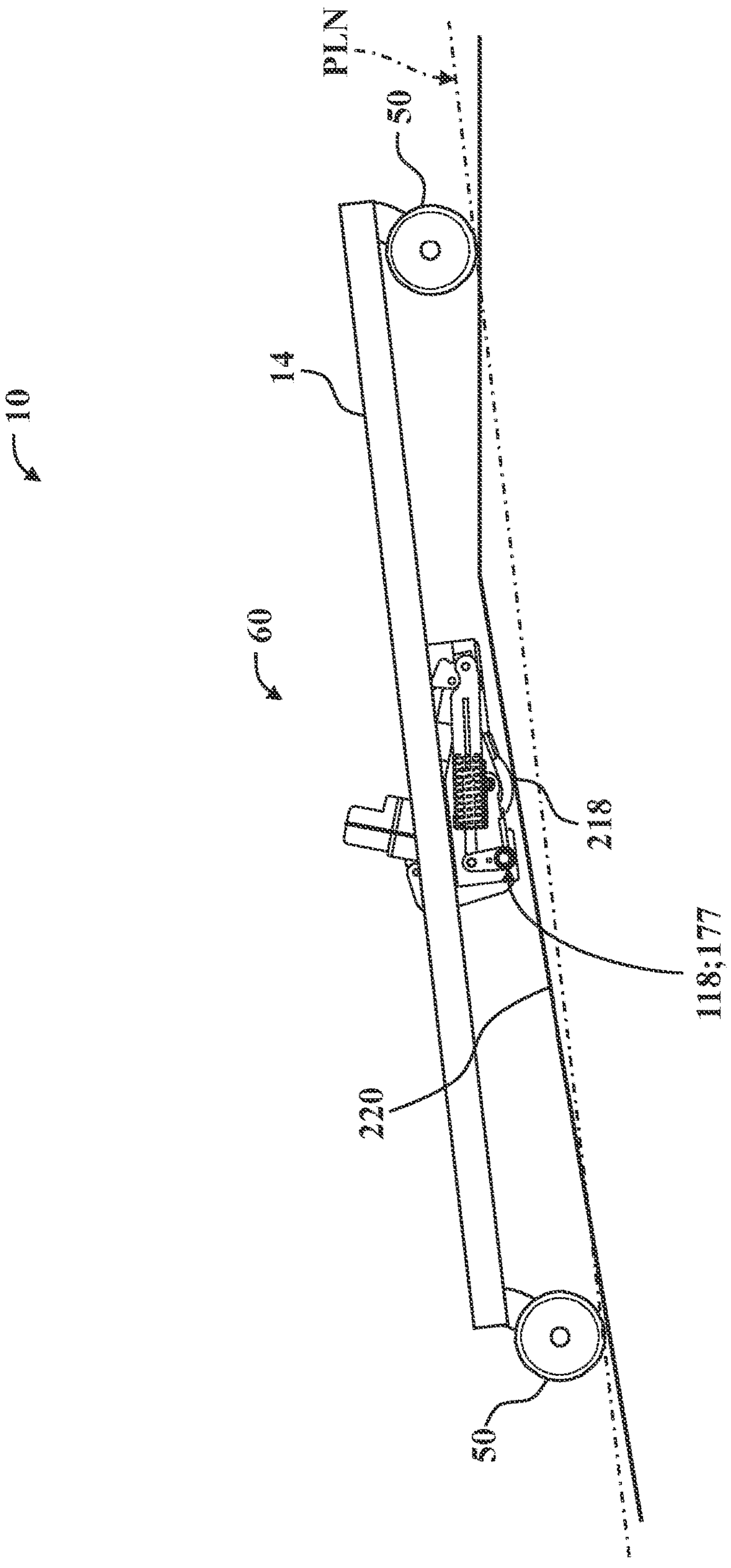
FIGS. 20B-20C are elevation views illustrating operation during ramp transitions.

For example, FIGS. 17A-17C illustrate a vertical movement of the auxiliary wheel 218 with the auxiliary wheel assembly 214 in the deployed position 222. With the auxiliary wheel assembly 214 in the deployed position 222, the spring cartridge assembly 230 biases the auxiliary wheel 218 towards the floor surface 220 such that the auxiliary wheel 218 is spaced a first vertical distance, V1, from the support frame 212. In addition, the spring cartridge assembly 230 imparts sufficient downward force to the auxiliary wheel 218 to maintain sufficient traction between the auxiliary wheel 218 and the floor surface 220. During operation, as the patient support apparatus 10 travels over an inclined floor surface 220 such as, for example, over a peak (e.g., during the transition onto a ramp to travel down the ramp, or during the transition off of a ramp when traveling up the ramp; see FIG. 20B), the spring cartridge assembly 230 allows the auxiliary wheel 218 to move towards the support frame 212 and to a second vertical distance, V2, from the support frame 212 that is less than the first vertical distance, V1. In addition, as the patient support apparatus 10 travels over a declining floor surface 220 such as, for example, through a trough (e.g., during the transition onto a ramp to travel up the ramp, or during the transition off of a ramp when traveling down the ramp; see FIG. 20C), the spring cartridge assembly 230 biases the auxiliary wheel 218 away from the support frame 212 and towards a third vertical distance, V3, from the support frame 212 that is greater than the first vertical distance, V1. By enabling the auxiliary wheel 218 to travel vertically with respect to the support frame 212 with the auxiliary wheel assembly 214 in the deployed position 222, the spring cartridge assembly 230 facilitates maintaining sufficient traction between an uneven floor surface 220 and the auxiliary wheel 218 to enable the auxiliary wheel 218 to influence motion of the patient support apparatus 10 during operation.

Figure 12:
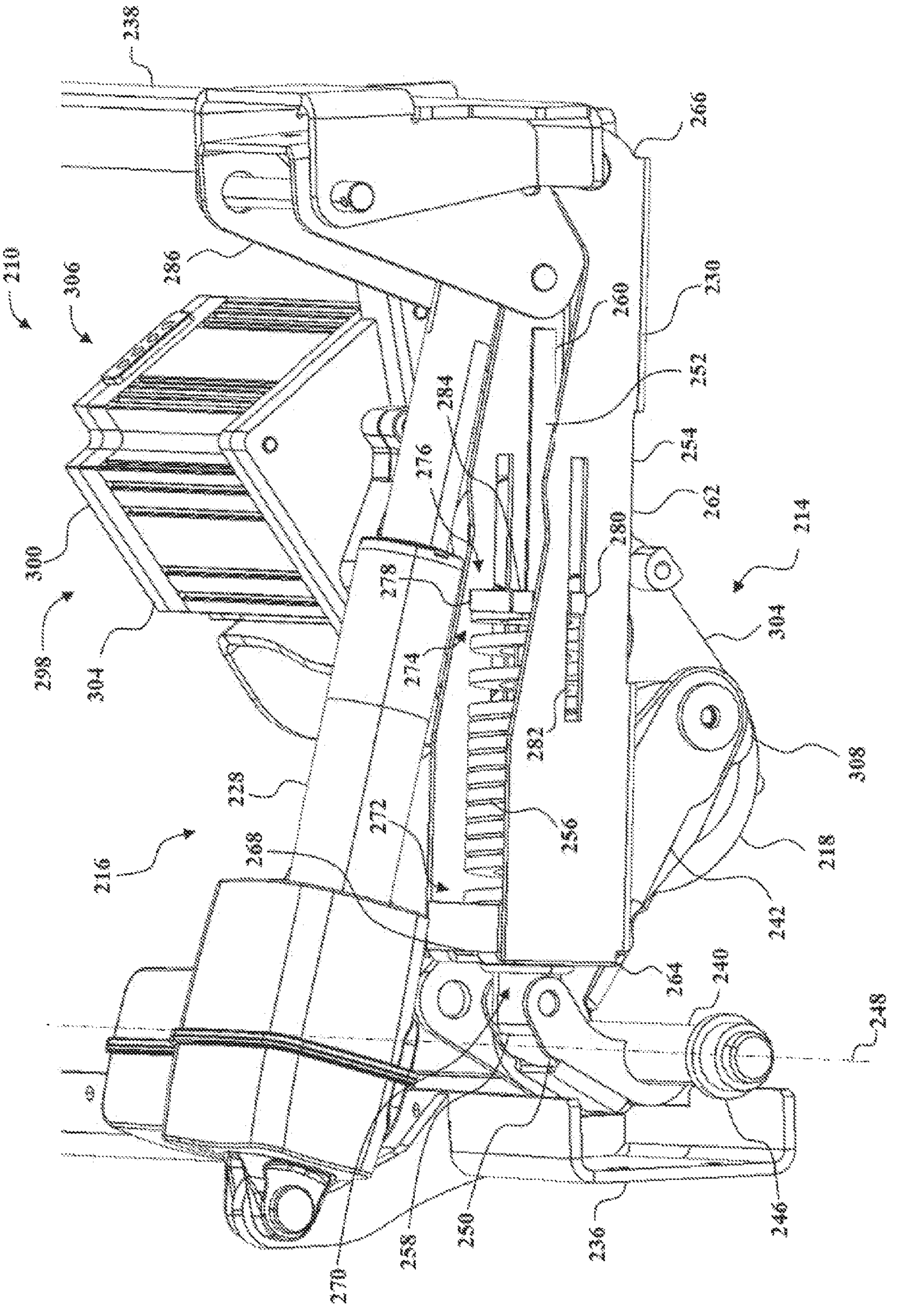
FIG. 12 is a perspective view of a portion of the auxiliary wheel assembly shown in FIG. 11.
Figure 13:
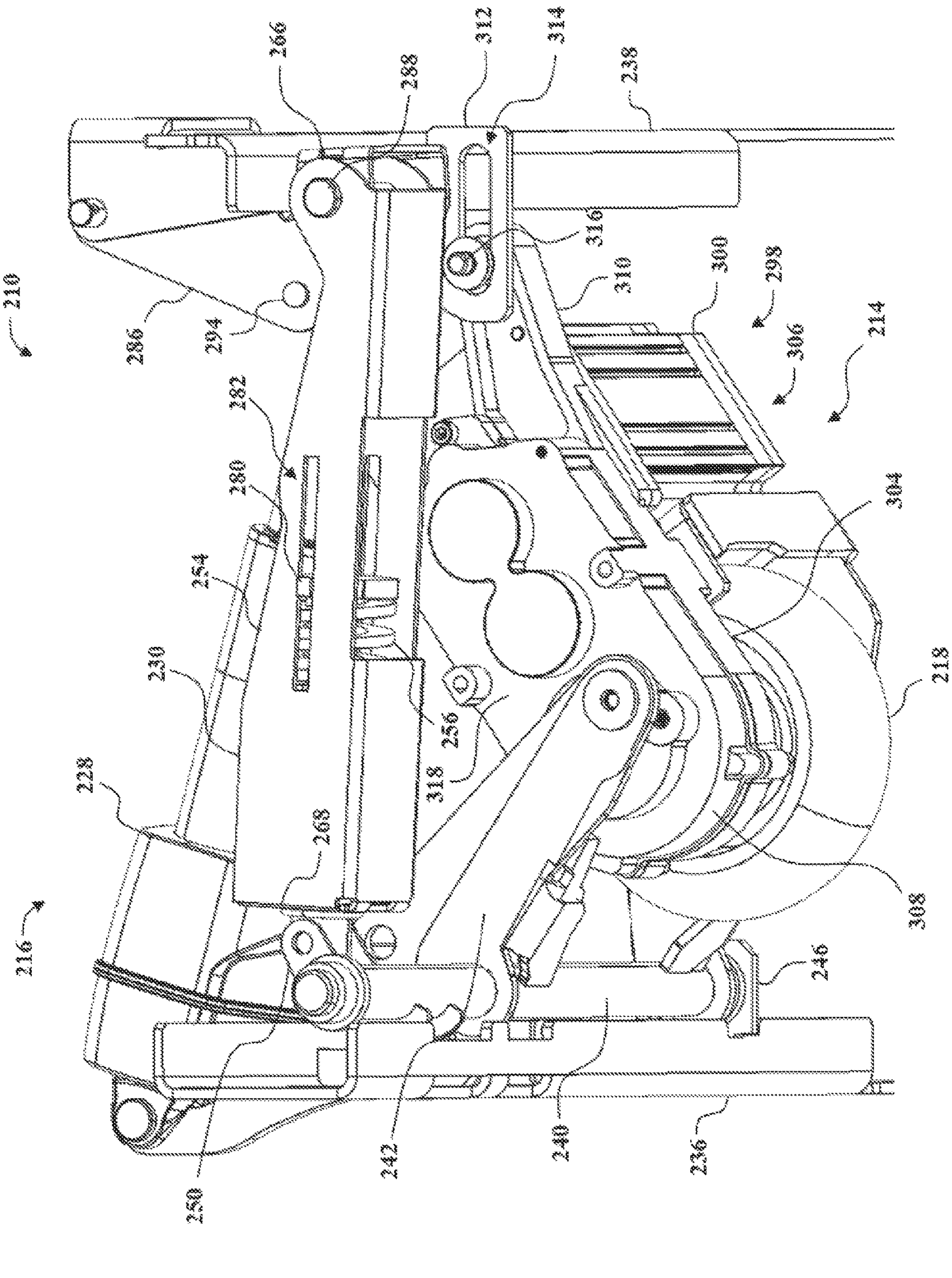
FIG. 13 is another perspective view of a portion the auxiliary wheel assembly shown in FIG. 11.
Figure 14:
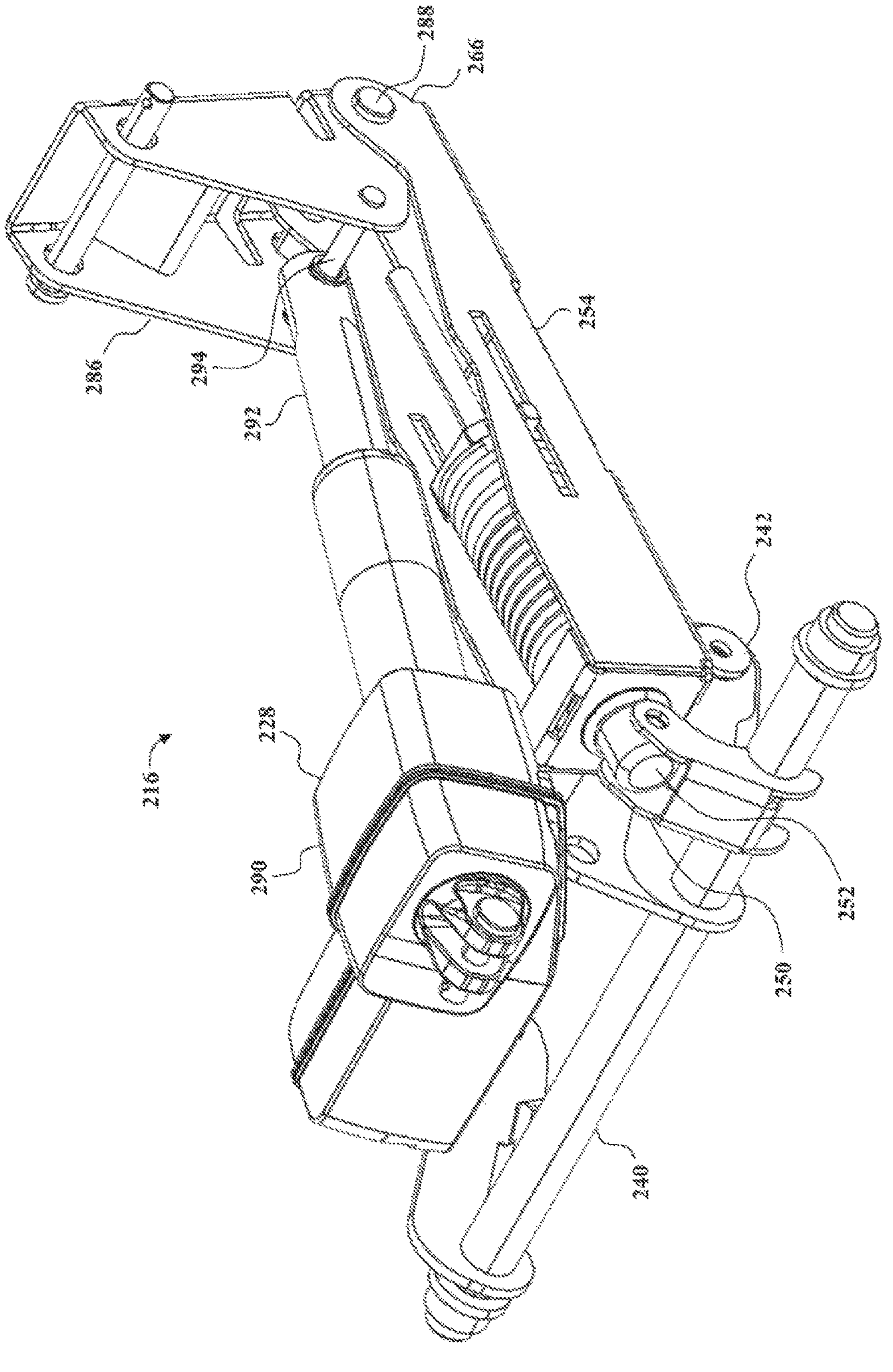
FIG. 14 is a perspective view of the lift actuator assembly that may be used with the auxiliary wheel assembly shown in FIG. 11.
Figure 15A:
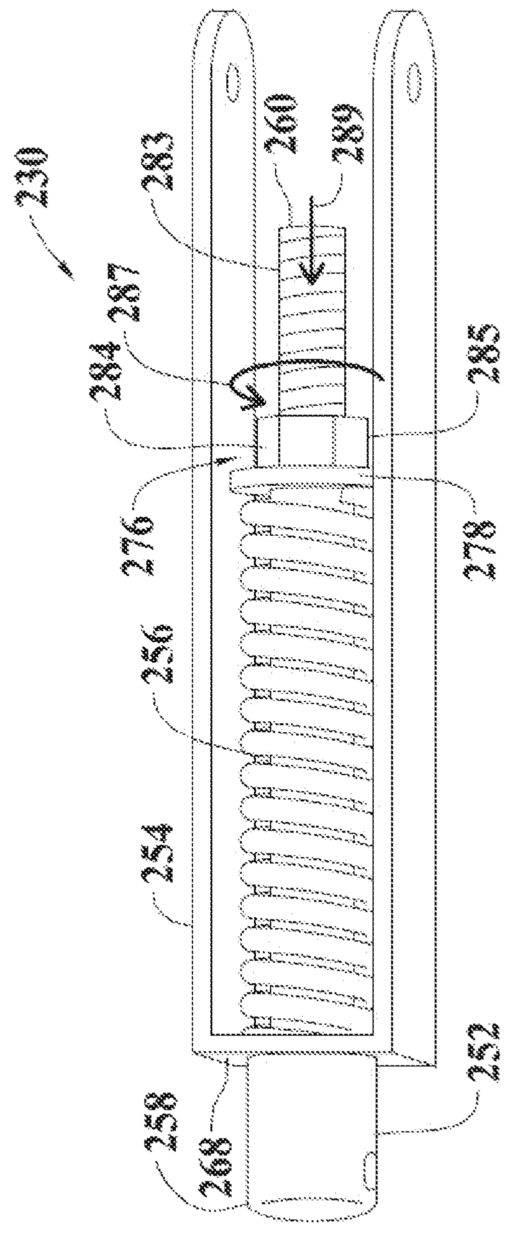
FIGS. 15A and 15B are elevation views of the spring cartridge assembly of the auxiliary wheel assembly shown in FIG. 11.
Figure 15B:
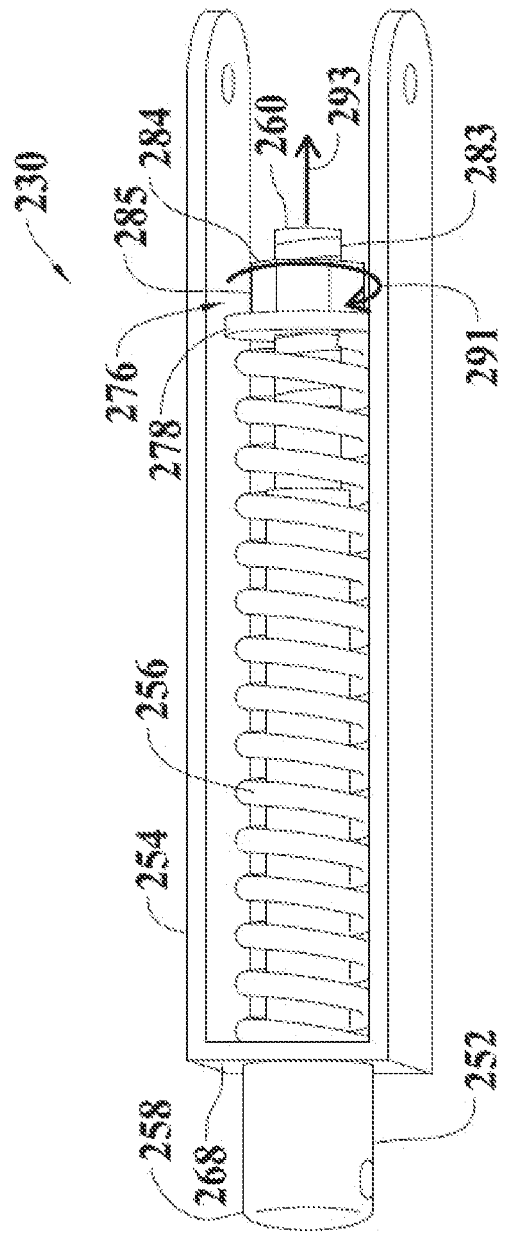

Referring to FIGS. 12, 13, and 14, in the versions shown, the support frame 212 includes a first cross-member 236 and a second cross-member 238. The second cross-member 238 is spaced a distance from the first cross-member 236 along the longitudinal axis 18. The first cross-member 236 and the second cross-member 238 are each coupled between the pair of opposing side support members 206, 208.

In the versions shown, the auxiliary wheel assembly 214 also includes a crank shaft 240 and a wheel support frame 242. The crank shaft 240 is coupled to the first cross-member 236 with a crank shaft bracket 246 that extends outwardly from an outer surface of the first cross-member 236. The crank shaft 240 extends along a centerline axis 248 and is rotatably coupled to the first cross-member 236 such that the crank shaft 240 is rotatable about the centerline axis 248. The wheel support frame 242 extends radially outwardly from the crank shaft 240 such that a rotation of the crank shaft 240 cause a rotation of the wheel support frame 242 about the centerline axis 248 of the crank shaft 240. The wheel support frame 242 is coupled to the auxiliary wheel 218 such that a rotation of the crank shaft 240 causes a vertical movement of the auxiliary wheel 218. The auxiliary wheel assembly 214 also includes a crank 250 that extends radially outwardly from the crank shaft 240 such that a rotation of the crank 250 causes a rotation of the crank shaft 240 about the centerline axis 248 of the crank shaft 240. The crank 250 is coupled to the spring cartridge assembly 230 such that a movement of spring cartridge assembly 230 via the lift actuator 228 causes a rotation of the crank shaft 240.

The spring cartridge assembly 230 includes a piston rod 252, a cartridge housing 254, and a compression spring 256. The piston rod 252 is pivotably coupled to the crank 250 and the cartridge housing 254 is coupled to the lift actuator 228. The cartridge housing 254 is movable with respect to the piston rod 252. The compression spring 256 acts between the cartridge housing 254 and to the piston rod 252 such that a movement of the cartridge housing 254 causes a movement of the piston rod 252. In addition, a movement of the piston rod 252 causes a movement of the crank 250 which in turn causing a rotation of the crank shaft 240 and wheel support frame 242.

The piston rod 252 extends between a first rod end 258 and a second rod end 260, and is at least partially positioned within the cartridge housing 254. The cartridge housing 254 includes a plurality of sidewalls 262 extending between a first end 264 and a second end 266. A guide plate 268 is coupled to the plurality of sidewalls 262 and is positioned at the first end 264 of the cartridge housing 254. The guide plate 268 includes a rod opening 270 that is defined through the guide plate 268. The rod opening 270 is sized and shaped to receive the piston rod 252 therethrough. The second rod end 260 extends through the rod opening 270. The first rod end 258 is located at an enlarged head of the piston rod 252 that is sized larger than the rod opening 270 so that the guide plate 268 is able to abut the enlarged head when stowing the auxiliary wheel 218. The enlarged head is pivotably coupled to the crank 250 via a fastening pin extending through the enlarged head and the crank 250. The second rod end 260 is positioned with the cartridge housing 254 and extends toward the second end 266 of the cartridge housing 254. The second rod end 260 is considered a free end, unconnected to any other structure.

The compression spring 256 extends between a first end 272 and a second end 274 and is positioned with the cartridge housing 254 such that the compression spring 256 surrounds a portion of the piston rod 252. The compression spring 256 is configured to bias the cartridge housing 254 towards the first rod end 258. The first end 272 of the compression spring 256 engages the guide plate 268 of the cartridge housing 254 and the second end 274 of the compression spring 256 acts against the piston rod 252 via a guide assembly 276 described below.

In the versions shown, the spring cartridge assembly 230 includes the guide assembly 276 that is coupled to the piston rod 252 and engages the compression spring 256. The guide assembly 276 includes a guide ring 278 that is coupled to the piston rod 252 and engages the compression spring 256. The guide ring 278 includes a pair of opposing positioning flanges 280 that extend outwardly from an outer surface of the guide ring 278. Each sidewall 262 of the cartridge housing 254 includes a guide slot 282 that extends through the sidewall 262. Each positioning flange 280 is inserted through a corresponding guide slot 282 to support the piston rod 252 from the cartridge housing 254. Each positioning flange 280 is slideably engaged within the guide slot 282 to enable the cartridge housing 254 to move with respect to the piston rod 252. In addition, the guide slots 282 are sized and shaped to allow a movement of the piston rod 252 with respect to the cartridge housing 254 with the lift actuator 228 in the extended position 232. For example, the guide slot 282 includes a length that enables the guide ring 278 to slide along a length of the guide slot 282 to enable the piston rod 252 to translate relative to the cartridge housing 254.

In some versions, the guide assembly 276 includes a biasing load adjustment assembly 284 for adjusting a load imparted by the compression spring 256. In the illustrated version, the biasing load adjustment assembly 284 includes an adjustment member 285 (see FIGS. 15A and 15B) that is coupled to the piston rod 252 and engages the guide ring 278 for adjusting an operating length of the compression spring 256 to adjust a load imparted by the compression spring 256 onto the piston rod 252 and cartridge housing 254. In addition, the biasing load adjustment assembly 284 enables a service technician to release the tension of the compression spring 256 thereby removing the biasing force on the auxiliary wheel 218 to enable the service technician to safely service the actuator assembly 216.

For example, the piston rod 252 may include an outer surface having a threaded portion 283. The adjustment member 285 may comprise a tensioning nut, threadably coupled to piston rod 252 along the threaded portion 283 such that a rotation of the tensioning nut with respect to the piston rod 252 adjusts the length of the compression spring 256. For example, a rotation of the tensioning nut in a first rotational direction 287 moves the tensioning nut 285 and the guide ring 278 along the piston rod 252 in a first linear direction 289 that decreases the length of the compression spring 256 to preload a compressive force onto the compression spring 256. A rotation of the tensioning nut 285 in a second opposite rotational direction 291 moves the tensioning nut 285 and the guide ring 278 along the piston rod 252 in a second linear direction 293 that increases the length of the compression spring 256 to reduce the compressive force of the compression spring 256. In addition, during normal operation, the compression spring 256 is in compression in all positions. In order to service the actuator assembly 216, the service technician may remove the compression on the compression spring 256 by loosening the tensioning nut 285, thereby allowing the service technician to safely remove the crank 240 pin and service the actuator assembly 216.

Referring to FIGS. 16A and 16B, the actuator assembly 216 includes an actuator support bracket 286 that is hingedly coupled to the second cross-member 238. The cartridge housing 254 is pivotably coupled to the actuator support bracket 286 via a fastening pin 288 inserted through the second end 266 of the cartridge housing 254 and the actuator support bracket 286. The lift actuator 228 is coupled to the actuator support bracket 286 such that a movement of the lift actuator 228 causes a movement of the actuator support bracket 286 and the cartridge housing 254.

In the versions shown, the lift actuator 228 is a linear actuator that includes an actuator housing 290 and an actuator rod 292. The actuator rod 292 has a proximal end received in the actuator housing 290 and a distal end spaced from the actuator housing 290. The distal end of the actuator rod 292 is configured to be movable relative to the actuator housing 290 to extend and retract an overall length of the lift actuator 228. The actuator rod 292 is movable between the extended position 232 (shown in FIG. 16A) with the actuator rod 292 extending outwardly from the actuator housing a first distance, and the retracted position 234 (shown in FIG. 16B) with the actuator rod 292 extending outwardly from the actuator housing a second distance that is longer than the first distance. The actuator housing 290 is coupled to the first cross-member 236. The actuator rod 292 is pivotably coupled to the actuator support bracket 286 with a fastening pin 294. The support frame 212 includes an actuator support arm 296 that extends outwardly from the first cross-member 236. The actuator support arm 296 is coupled to the actuator housing 290 to support the actuator housing 290 from the first cross-member 236.

In the versions shown, the auxiliary wheel assembly 214 also includes an auxiliary wheel drive system 298 (see FIGS. 12-13) operatively coupled to the auxiliary wheel 218. The auxiliary wheel drive system 298 is configured to drive (e.g. rotate) the auxiliary wheel 218. In the version shown, the auxiliary wheel drive system 298 includes a motor assembly 300 coupled to a power source 302 such as, for example, a battery for providing electrical power to energize the motor assembly 300. The motor assembly 300 that is coupled to the auxiliary wheel 218 for rotating the auxiliary wheel 218 about the rotational axis R. The motor assembly 300 includes a motor assembly housing 304 and a motor 306 positioned within the motor assembly housing 304. The motor 306 is coupled to the auxiliary wheel 218 for providing motive power to the auxiliary wheel 218. The motor assembly housing 304 includes a body (also referred to as a link) that extends between a first housing end 308 and a second housing end 310 (see FIG. 13). The first housing end 308 is pivotably coupled to the wheel support frame 242 via a fastener such that a rotation of the crank shaft 240 causes a vertical movement of the motor assembly housing 304 and the auxiliary wheel 218. The second housing end 310 is pivotably coupled to the second cross-member 238.

Referring to FIG. 13, the support frame 212 includes a motor assembly support bracket 312 that extends outwardly from the second cross-member 238. The motor assembly support bracket 312 is coupled to the motor assembly housing 304 to support the motor assembly housing 304 from the second cross-member 238. The motor assembly support bracket 312 includes a translation slot 314 that extends through an outer surface of the motor assembly support bracket 312. The motor assembly housing 304 is pivotably and moveably coupled to the motor assembly support bracket 312 with a fastening pin 316 that extends outwardly from the motor assembly housing 304 and through the translation slot 314. The motor assembly housing 304 is configured to articulate and translate relative to the second cross-member 238. The translation slot 314 is sized and shaped to enable the fastening pin 316 to slide along a length of the translation slot 314 to enable the motor assembly housing 304 to translate relative to the motor assembly support bracket 312.

In some versions, the motor assembly 300 includes a gear train assembly 318 that is coupled to the motor 306 and the auxiliary wheel 218 for transferring torque from the motor 306 to the auxiliary wheel 218. The gear train assembly 318 may also be positioned within motor assembly housing 304.

In the versions shown, referring back to FIG. 16A, during operation, as the lift actuator 228 moves to the extended position, the actuator rod 292 causes the actuator support bracket 286 to pivot toward the second cross-member 238 which causes the cartridge housing 254 to move towards the second cross-member 238 and away from the crank shaft 240. As the cartridge housing 254 moves toward the second cross-member 238, the guide plate 268 engages and compresses the compression spring 256 which, in turn, pushes the piston rod 252 toward the second cross-member 238. As the piston rod 252 moves toward the second cross-member 238, the piston rod 252 causes the crank 250 to rotate the crank shaft 240 and the wheel support frame 242 in a first rotational direction. The rotation of the wheel support frame 242 causes the motor assembly housing 304 and the auxiliary wheel 218 to move away from the support frame 212 to the deployed position 222. In the deployed position 222, the lift actuator 228 is in the extended position 232 and an outer surface of the actuator support bracket 286 contacts the second cross-member 238 to prevent further extension of the actuator rod 292. In addition, referring back to FIG. 13, as the motor assembly housing 304 moves away from the support frame 212, the fastening pin 316 slides along the translation slot 314 to enable the motor assembly housing 304 to pivot and translate relative to the motor assembly support bracket 312.

As the lift actuator 228 moves to the retracted position 234, as shown in FIG. 16B, the actuator rod 292 causes the actuator support bracket 286 to pivot away from the second cross-member 238 which causes the cartridge housing 254 to move towards the first cross-member 236 and towards the crank shaft 240. As the cartridge housing 254 moves toward the crank shaft 240, the guide plate 268 engages the enlarged head of the piston rod 252 pivotally connected to the crank 250 which, in turn, causes the crank 250 to rotate the crank shaft 240 and the wheel support frame 242 in a second opposite rotational direction, which causes the motor assembly housing 304 and the auxiliary wheel 218 to move to the stowed position 224.

The guide ring 278 moves within the guide slot 282 to enable the piston rod 252 and compression spring 256 to move with respect to the cartridge housing 254 which, in turn, allows for a rotation of the crank shaft 240 to enable movement of the auxiliary wheel 218 in the vertical direction. By enabling the auxiliary wheel 218 to travel vertically with respect to the support frame 212 with the auxiliary wheel assembly 214 in the deployed position 222, the spring cartridge assembly 230 facilitates maintaining sufficient traction between an uneven floor surface 220 and the auxiliary wheel 218 to enable the auxiliary wheel 218 to influence motion of the patient support apparatus 10 during operation.

Referring to FIGS. 17A-17C, with the with the auxiliary wheel assembly 214 in the deployed position 222, as the patient support apparatus 10 travels over uneven floor surfaces, the compression spring 256 provides suspension functions for the auxiliary wheel assembly 214 by acting between the cartridge housing 254 and the piston rod 252.

For example, as shown in FIGS. 17A and 17B, as the patient support apparatus 10 transitions from a flat surface to an inclined floor surface, the spring cartridge assembly 230 allows the auxiliary wheel 218 to move towards the support frame 212. As the downward force imparted on the auxiliary wheel 218 by the patient support apparatus 10 increases, the crank shaft 240 rotates to move the enlarged head of the piston rod 252 away from the cartridge housing 254. The guide ring 278 then moves towards the guide plate 268 compressing the compression spring 256 against the guide plate 268, allowing the compression spring 256 to absorb the downward force of the weight of the patient support apparatus 10.

Referring to FIGS. 17A and 17C, as the patient support apparatus 10 transitions from a flat surface to a declined floor surface, the spring cartridge assembly 230 biases the auxiliary wheel 218 away from the support frame 212. As the downward force of the patient support apparatus 10 decreases, the compression spring 256 expands to move the guide ring 278 away from the guide plate 268 which causes the crank shaft 240 to rotate in the opposite direction to move the auxiliary wheel 218 away from the support frame 212 to remain in contact with the declining floor surface.

Although an exemplary version of an auxiliary wheel assembly 214 is described above and shown in the figures, it should be appreciated that other configurations employing a lift actuator 228 to move the auxiliary wheel 218 between the retracted position 234 and deployed position 222 are contemplated. A control system and associated controller, one or more user input devices, and one or more sensors, may be employed to control operation of the lift actuator 228 and the auxiliary wheel drive system 298, in the manner described in U.S. patent application Ser. No. 16/222,506, hereby incorporated herein by reference.

Figure 18:
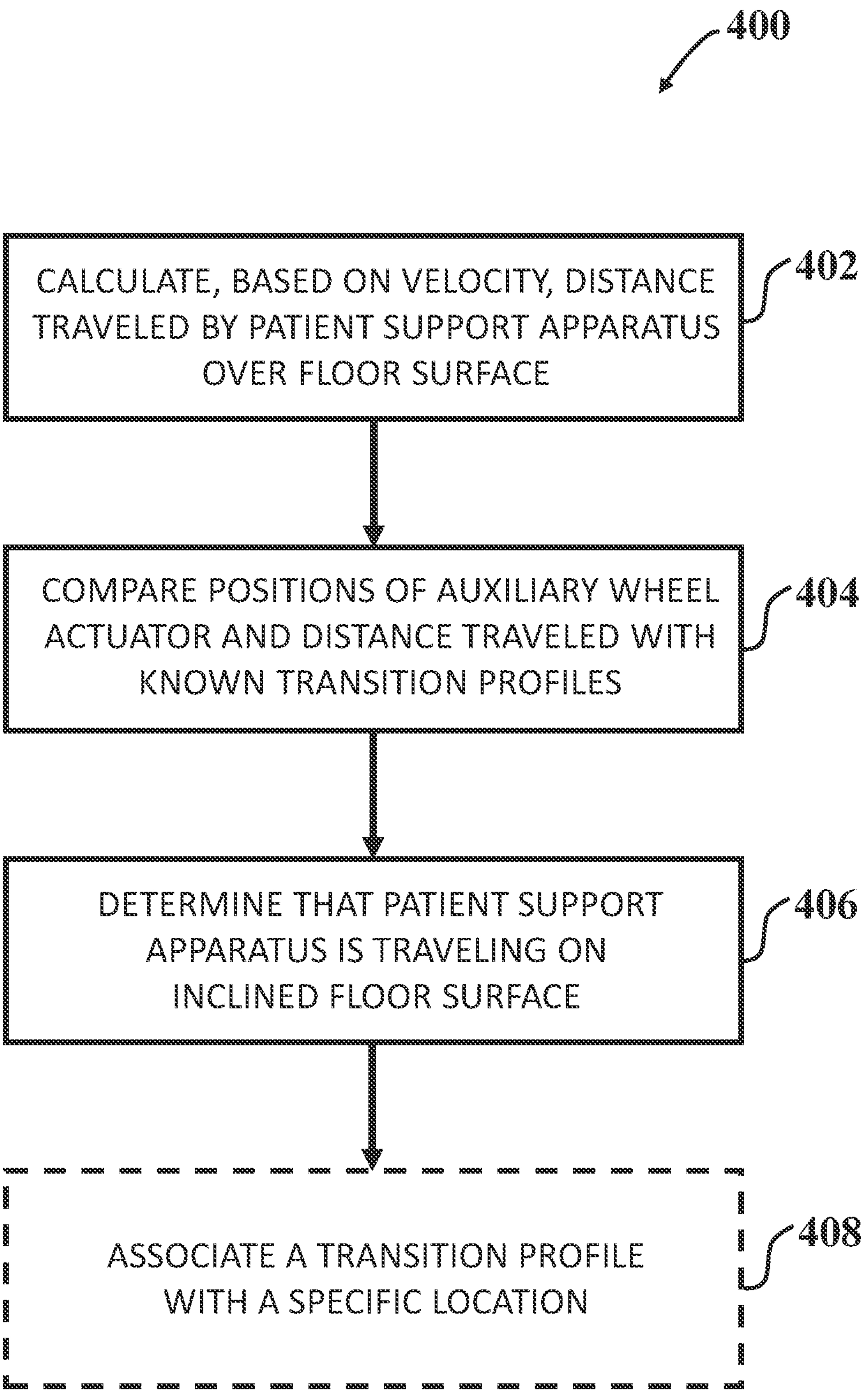
FIG. 18 is a flow chart of a method illustrating an algorithm to recognize a plurality of transition profiles during operation of the auxiliary wheel assembly of the patient support apparatus shown in FIG. 1.

FIG. 18 is a flow chart of method 400 illustrating an algorithm that is executed by the controller 162 to recognize a plurality of transition profiles during operation of the auxiliary wheel assembly 60. The method includes a plurality of steps. Each method step may be performed independently of, or in combination with, other method steps. Portions of the methods may be performed by any one of, or any combination of, the components of the controller 162 and/or the auxiliary wheel assembly control circuit 106. In some versions, the controller 162 may include an auxiliary wheel control module 178 that is configured to execute one more of the algorithms illustrated in method 400. In addition, the auxiliary wheel control module 178 may be configured to operate the auxiliary wheel assembly control circuit 106 to perform one or more of the algorithm steps illustrated in method 400. In some versions, the auxiliary wheel control module 178 may include a state machine configured to execute the steps illustrated in method 400. In some versions, the auxiliary wheel control module 178 may include computer-executable instructions that are stored in the memory device 166 and cause one or more processors 164 of the controller 162 to execute the algorithm steps illustrated in method 400.

Referring to FIG. 18, in some versions, the controller 162 is programmed to execute the algorithm illustrated in method 400 for recognizing a plurality of transition profiles and for operating the patient support apparatus 10, at least one of which represents a transition over an inclined floor surface. In some configurations, the transition profile that represents a transition over an inclined floor surface includes a threshold value based on the wheel position sensor 118 indicating that the auxiliary wheel 218 is above a plane PLN associated with the support wheel 50 (see FIG. 20B). Here, the plane PLN may be defined based on engagement of the support wheels 50 with a flat and non-inclined floor surface 20, and the threshold value of the wheel position sensor may correspond to "upward" movement of the auxiliary wheel 218 away from the plane PLN which places the auxiliary wheel 218 "above" the plane PLN (see FIG. 20B). When this threshold is reached, it may indicate that the patient support apparatus 10 is traveling onto a downward incline (from level ground down a ramp, for example). It will be appreciated that the forgoing description of the plane PLN and the threshold value is illustrative and non-limiting, and the plane PLN may be defined in a number of different ways. Similarly, it will be appreciated that the threshold value could be determined in other ways, and that the controller 162 could determine changes in the floor surface 220 which represent transitions onto (or off of) inclined surfaces in other ways (e.g., via the floor sensor 179). Other configurations are contemplated.

Figure 20C:
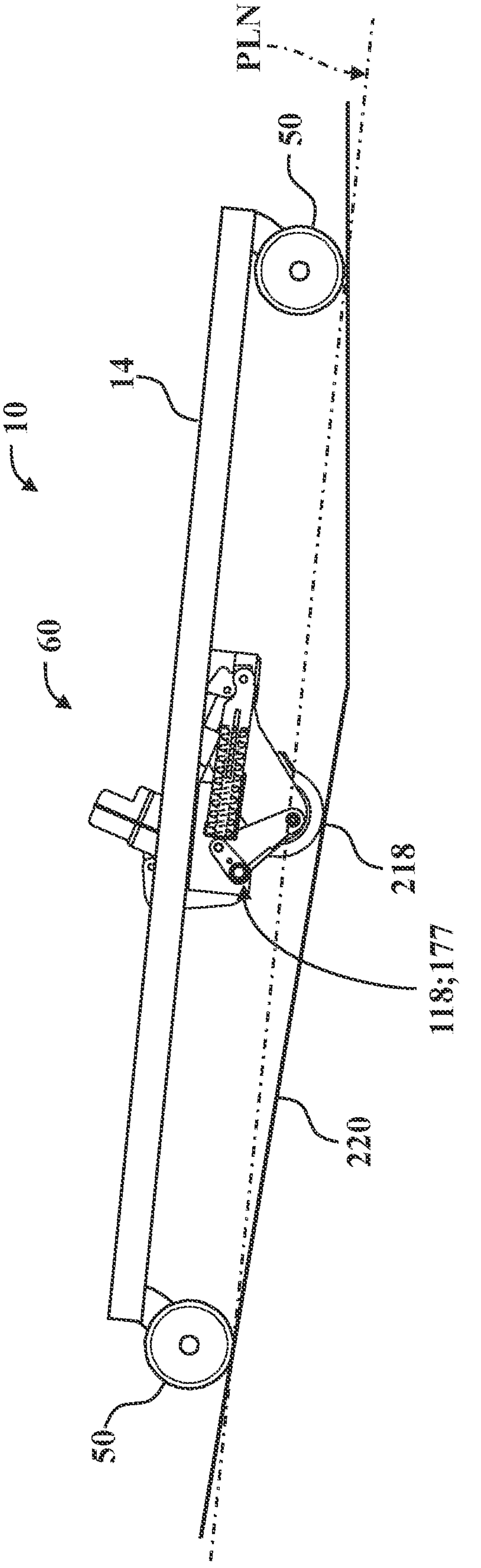

In yet other configurations, the transition profile that represents a transition over an inclined floor surface includes a threshold value based on the wheel position sensor 118 indicating that the auxiliary wheel 218 is below a plane PLN associated with the support wheel 50 (see FIG. 20C). Here too, the plane PLN may be defined based on engagement of the support wheels 50 with a flat and non-inclined floor surface 20, and the threshold value of the wheel position sensor may correspond to "downward" movement of the auxiliary wheel 218 away from the plane PLN which places at least a portion of the auxiliary wheel 218 "below" the plane PLN (see FIG. 20C). When this threshold is reached, it may indicate that the patient support apparatus 10 is traveling onto an upward incline (from level ground up a ramp, for example). Here too, it will be appreciated that the forgoing description of the plane PLN and the threshold value is illustrative and non-limiting, and the plane PLN may be defined in a number of different ways. Similarly, it will be appreciated that the threshold value could be determined in other ways, and that the controller 162 could determine changes in the floor surface 220 which represent transitions onto (or off of) inclined surfaces in other ways (e.g., via the floor sensor 179). Other configurations are contemplated.

In method step 402, the controller 162 calculates or otherwise determines, based on a velocity of the patient support apparatus 10 over the floor surface, a distance traveled by the patient support apparatus 10 over the floor surface. As will be appreciated from the subsequent description below, the controller may calculate distance traveled based on sensor data associated with actual movement (e.g., monitoring movement of wheels, monitoring the floor, receiving tracking information from an external source, and the like), and/or may calculate distance traveled in other ways, such as based on an expected amount of movement based on changes in commanded inputs, previous motion, weight or load, friction or wheel slippage, motor current, and the like. In some configurations, a processor 164 calculates or otherwise determines a distance traveled by the patient support apparatus 10 over the floor surface based on one or more signals received from the velocity sensor 177. In yet other configurations, a processor 164 calculates or otherwise determines a distance traveled by the patient support apparatus 10 over the floor surface based on one or more signals received from a user interface (e.g., user interface 40 or graphical user interface 41). Here, for example, the controller 162 could calculate the distance traveled based on known output speeds of the auxiliary wheel 218 expected from inputs made to the throttle assembly 130.

In method step 404, the controller 162 compares a plurality of positions of the auxiliary wheel actuator 64 (in some configurations, a log of these positions may be stored in the memory device 166) and the distance traveled by the patient support apparatus 10 with the known transition profiles. In some versions, instead of using the positions of the auxiliary wheel actuator 64 in this comparison, the controller 162 could instead use signals received from the floor sensor 179 to sense changes in the distance to the floor surface. In method step 406, the controller 162 determines that the patient support apparatus 10 is traveling on an inclined floor surface. Here, for example, the controller 162 could monitor changes in signals generated by the wheel position sensor 118 (and/or the floor sensor 179) with respect to the calculated distance traveled over time to determine that the patient support apparatus 10 has transitioned onto a ramp. In this example, a known transition profile representing movement onto a ramp could be defined based on a predetermined amount of change in the signal generated by the wheel position sensor 118 over time correlated with an expected predetermined amount distance traveled by the patient support apparatus 10 over that period of time. If, for example, the signal generated by the wheel position sensor 118 (and/or the floor sensor 179) changes to indicate movement from the first vertical distance V1 (see FIG. 17A) to the second vertical distance V2 (see FIG. 17B) and then back to the first vertical distance V1 at a rate which, in view of the calculated distance traveled, indicates a transition onto a declined surface (e.g., down a ramp) has occurred (e.g., fully onto the declined ramp from the position shown in FIG. 20B). It will be appreciated that changes in the signals generated by the wheel position sensor 118 over time can be used to ignore "bumps" on the floor surface that would otherwise cause the auxiliary wheel 218 to move towards the second vertical distance V2 but which do not correspond to movement onto an inclined surface.

In an optional method step 408, the controller 162 (or a processor 164) associates a transition profile with a specific location. In method step 410, the memory device 166 stores the transition profile. By way of example and not limitation, a location may be a medical/healthcare facility. The transition profile may include or otherwise be defined based on information about an architectural layout associated with the location, which may include a plurality of features such as: length, width, and shape of hallways; ramps or other features that effect changes in elevation of floor surface; number and width of hallway corners; bridges between buildings of a facility; changes in floor surface; elevators; floors of a building; ingress/egress points of a building; paths, sidewalks, roads, and the like adjacent to one or more buildings; and/or any other feature of the location layout that might affect maneuverability of the patient support apparatus 10 (e.g., locations defined relative to specific units such as med-surge, intensive care, radiology, and the like). In some versions, the process of generating or otherwise calibrating transition profiles may be carried out by a technician or another user (e.g., by selecting an option using the user interface 40 or graphical user interface 41) to place the patient support apparatus 10 into a "learn" mode where the distance traveled is measured or otherwise determined and is monitored, logged, recorded, or otherwise evaluated relative to the distance to the floor measured such as via signals generated by the position sensor 118 (and/or the floor sensor 179). Here, in such a "learn" mode, data associated with particular ramps, inclines, and the like may be stored as transition profiles (e.g., such as waveforms, data logs, and the like) for later use by the controller 162 to recognize during operation, such as by observing current movement of the position sensor 118 (and/or the floor sensor 179) over calculated distances and recognizing corresponding transition profiles stored in memory.

In some versions, the controller 162 can identify its location within a particular healthcare facility based on uniquely recognized inclines that are associated with stored transition profiles, such as where a healthcare facility has only one "long" ramp and the controller 162 recognizes the transition onto and subsequently off of the ramp based on sensor data and calculated or sensed distance traveled). However, it will be appreciated that stored In some versions, stored transition profiles may represent the sensor data associated with movement onto of one end of a ramp, while in other versions data may represent movement onto one end of a ramp along with movement along the ramp and/or subsequent movement off of the ramp. In some versions, stored transition profiles may represent irregular profiles that can be "ignored" for certain purposes, such as with one or more "short" ramps or other incline changes that may otherwise appear to be a "long" ramp but for the distance traveled relative to one or more transitions. Other configurations are contemplated. It will be appreciated that stored transition profiles may be standardized for general purpose use in various facilities, such as with "default" transition profiles stored in memory for predetermined incline angles, ramp lengths, ramp transition profiles, and the like. These types of standardized transition profiles may be calibrated to correspond to sensor data associated with a specific patient support apparatus 10 (e.g., to calibrate or recalibrate gain, offset, and the like when replacing wheel position sensors 118). Put differently, calibration may be used to modify or differently interpret "standard" transition profiles stored in memory. In addition or alternatively, non-standardized transition profiles may be generated, selected, or created to suit particular facility layout. These may involve adjustments made by technicians (e.g., selecting an option with a service tool used for facilities with particularly long ramps). Similarly, non-standardized transition profiles may be calibrated and/or generated using the "learn" mode described above. Accordingly, it will be appreciated that transition profiles may be associated with particular locations within a facility, may be associated with particular facilities and not with respect to discrete ramps or locations within a facility, or may be associated with certain types of ramps based on the specific sensor output ranges of a particular patient support apparatus 10. Other configurations are contemplated.

Figure 19:
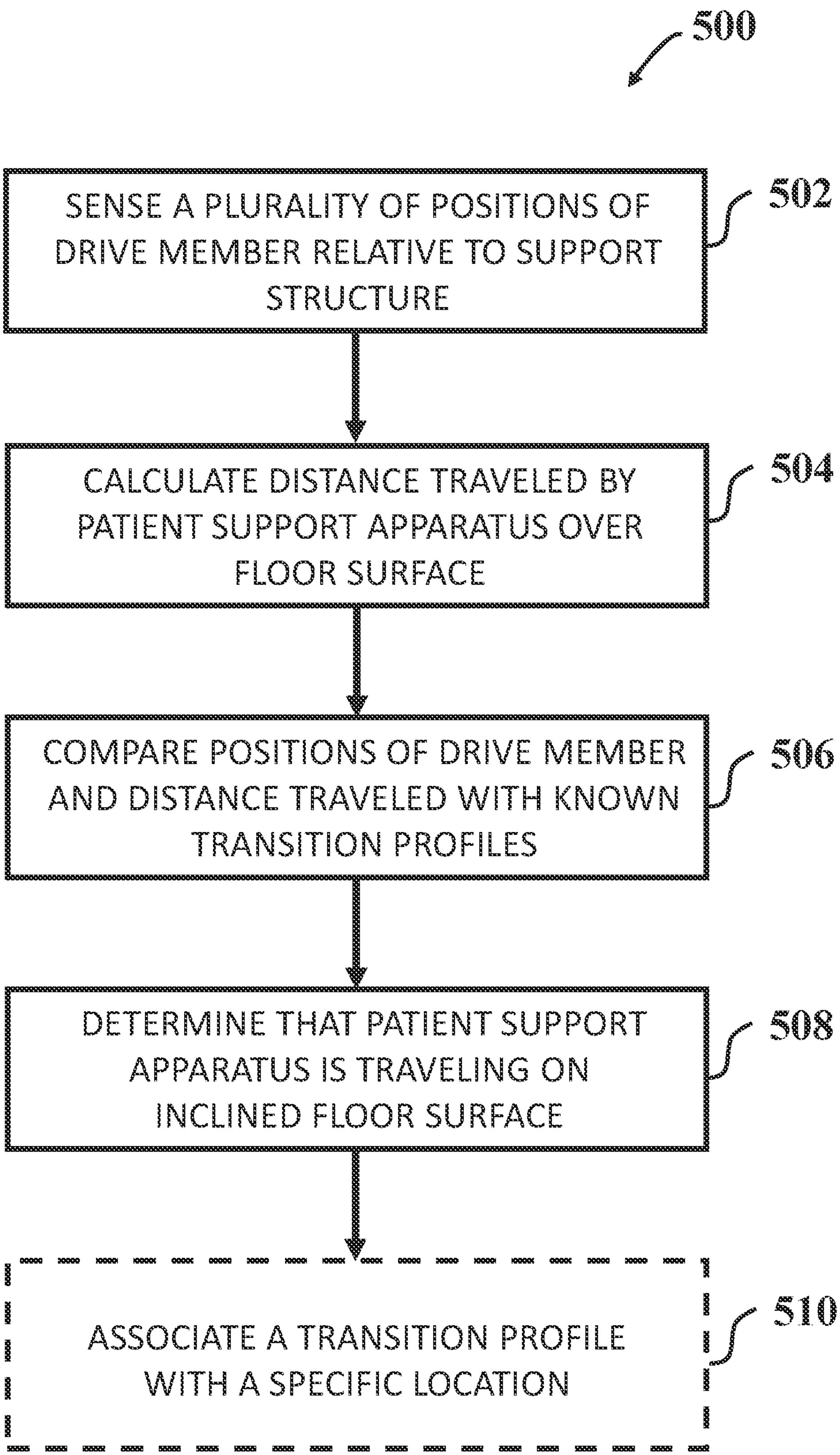
FIG. 19 is a flow chart of a method illustrating an algorithm to recognize a plurality of transition profiles during operation of the drive member of the patient support apparatus shown in FIG. 1.

FIG. 19 is a flow chart of an alternative method 500 illustrating an algorithm that is executed by the controller 162 to recognize a plurality of transition profiles during operation of the drive member 62. The method includes a plurality of steps. Each method step may be performed independently of, or in combination with, other method steps. Portions of the methods may be performed by any one of, or any combination of, the components of the controller 162 and/or the control circuit 106. In some versions, the controller 162 may include a control module 178 that is configured to execute one more of the algorithms illustrated in method 500. In addition, the control module 178 may be configured to operate the control circuit 106 to perform one or more of the algorithm steps illustrated in method 500. In some versions, the control module 178 may include a state machine configured to execute the steps illustrated in method 500. In some versions, the control module 178 may include computer-executable instructions that are stored in the memory device 166 and cause one or more processors 164 of the controller 162 to execute the algorithm steps illustrated in method 500.

Referring to FIG. 19, in some versions, the controller 162 is programmed to execute the algorithm illustrated in method 500 for recognizing a plurality of transition profiles and for operating the patient support apparatus 10, at least one of which represents a transition over an inclined floor surface.

In method step 502, the controller 162 senses a plurality of positions of the drive member 62 relative to the support structure 12. In some configurations, a log of these positions may be stored in the memory device 166. In method step 504, the controller 162 calculates or otherwise determines a distance traveled by the patient support apparatus 10 over the floor surface. In some configurations, a processor 164 calculates or otherwise determines a distance traveled by the patient support apparatus 10 over the floor surface based on one or more signals received from a sensor coupled to the support structure 12 (e.g., velocity sensor 177 or another sensor described herein). In yet other configurations, a processor 164 calculates or otherwise determines a distance traveled by the patient support apparatus 10 over the floor surface based on one or more signals received from a user interface (e.g., user interface 40 or graphical user interface 41).

In method step 506, the controller 162 compares a plurality of positions of the drive member 62 and the distance traveled by the patient support apparatus 10 with the plurality of known transition profiles. In some versions, the controller 162 instead compares changes in the distance to the floor surface 220 (based on signals received from the floor sensor 179) and the distance traveled by the patient support apparatus 10 with the plurality of known transition profiles. In method step 508, the controller 162 determines that the patient support apparatus 10 is traveling on an inclined floor surface.

In an optional method step 510, the controller 162 (or a processor 164) associates a transition profile with a specific location. By way of example and not limitation, a location may be a medical/healthcare facility. The transition profile may include information about an architectural layout associated with the location, which may include a plurality of features such as: length, width, and shape of hallways; ramps or other features that effect changes in elevation of floor surface; number and width of hallway corners; bridges between buildings of a facility; changes in floor surface; elevators; floors of a building; ingress/egress points of a building; paths, sidewalks, roads, and the like adjacent to one or more buildings; and/or any other feature of the location layout that might affect maneuverability of the patient support apparatus 10 (e.g., locations defined relative to specific units such as med-surge, intensive care, radiology, and the like). In method step 512, the memory device 166 stores the transition profile. In some configurations, the transition profile may be updated periodically or continuously.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus comprising:
a support structure including a base and a frame;
a support wheel coupled to the support structure;
a drive system including a drive member coupled to the support structure to influence motion of the patient support apparatus over a floor surface, a motor coupled to the drive member to operate the drive member at a speed, and a motor control circuit for transmitting power signals from a power source to the motor;
a user interface for receiving user commands from a user to operate the drive system; and
a control system coupled to the user interface and the drive system for operating the drive system, the control system including a memory device configured to store a plurality of transition profiles, wherein at least one of the plurality of transition profiles represents a transition over an inclined floor surface, and a processor coupled to the memory device and configured to:
sense a plurality of positions of the drive member relative to the support structure,
calculate a distance traveled by the patient support apparatus over the floor surface,
compare the plurality of positions of the drive member and the distance traveled by the patient support apparatus with the plurality of transition profiles, and
determine that the patient support apparatus is traveling on an inclined floor surface.

2. The patient support apparatus of claim 1, wherein the processor determines a distance traveled by the patient support apparatus over the floor surface based on one or more signals received from a sensor coupled to the support structure.

3. The patient support apparatus of claim 2, wherein the sensor is a potentiometer.

4. The patient support apparatus of claim 2, wherein the sensor is an ultrasonic sensor.

5. The patient support apparatus of claim 2, wherein the transition profile that represents a transition over an inclined floor surface includes a threshold value indicating that the sensor is above a plane associated with the support wheel.

6. The patient support apparatus of claim 2, wherein the transition profile that represents a transition over an inclined floor surface includes a threshold value indicating that the sensor is below a plane associated with the support wheel.

7. The patient support apparatus of claim 1, wherein the processor determines a distance traveled by the patient support apparatus over the floor surface based on one or more signals received from the user interface.

8. The patient support apparatus of claim 1, wherein the processor is further configured to associate a transition associated with a location.

9. The patient support apparatus of claim 8, wherein the location is a medical facility.

10. The patient support apparatus of claim 8, wherein the memory device is further configured to store the transition profile.

11. A patient support apparatus comprising:
a support structure including a base and a frame;
a velocity sensor configured to sense a velocity of the patient support apparatus over a floor surface;
a support wheel coupled to the support structure; and
an auxiliary wheel assembly including:
an auxiliary wheel coupled to the support structure to influence motion of the patient support apparatus over the floor surface, the auxiliary wheel assembly being positionable to a deployed position with the auxiliary wheel engaging the floor surface and to a retracted position with the auxiliary wheel spaced a distance from the floor surface;

an auxiliary wheel actuator operatively coupled to the auxiliary wheel by a wheel support structure;

an auxiliary wheel drive system including a motor coupled to the auxiliary wheel to rotate the auxiliary wheel relative to the support structure at a rotational speed; and a control system coupled to the auxiliary wheel drive system for operating the auxiliary wheel drive system, the control system including:

an auxiliary wheel position sensor coupled to the wheel support structure and configured to sense a plurality of positions of the auxiliary wheel actuator relative to the frame of the support structure; and a memory device configured to store a plurality of transition profiles, wherein at least one of the plurality of transition profiles is defined as an inclined floor surface profile representing a transition over an inclined floor surface; and a processor coupled to the memory device and programmed to:

calculate, based on the velocity of the patient support apparatus over the floor surface, a distance traveled by the patient support apparatus over the floor surface;

compare the plurality of positions of the auxiliary wheel actuator and the distance traveled by the patient support apparatus with the inclined floor surface profile, and determine that the patient support apparatus is traveling on an inclined floor surface.

12. The patient support apparatus of claim 11, wherein the auxiliary wheel position sensor is a potentiometer.

13. The patient support apparatus of claim 11, wherein the transition profile that represents a transition over an inclined floor surface includes a threshold value indicating that the auxiliary wheel position sensor is above a plane associated with the support wheel.

14. The patient support apparatus of claim 11, wherein the transition profile that represents a transition over an inclined floor surface includes a threshold value indicating that the auxiliary wheel position sensor is below a plane associated with the support wheel.

15. The patient support apparatus of claim 11, wherein the processor determines a distance traveled by the patient support apparatus over the floor surface based on one or more signals received from the velocity sensor.

16. The patient support apparatus of claim 11, further comprising a user interface for receiving user commands from a user to operate the auxiliary wheel drive system; and wherein the processor determines a distance traveled by the patient support apparatus over the floor surface based on one or more signals received from the user interface.

17. The patient support apparatus of claim 11, wherein the processor is further configured to associate a transition profile with a location.

18. The patient support apparatus of claim 17, wherein the location is a medical facility.

19. The patient support apparatus of claim 17, wherein the memory device is further configured to store the transition profile.

20. A patient support apparatus comprising:

a support structure including a base and a frame;

a support wheel coupled to the support structure;

a drive system including a drive member coupled to the support structure to influence motion of the patient support apparatus over a floor surface, a motor coupled to the drive member to operate the drive member at a speed, and a motor control circuit for transmitting power signals from a power source to the motor;

a user interface for receiving user commands from a user to operate the drive system;

a floor sensor operatively attached to the support structure to determine a distance to the floor surface; and a control system coupled to the user interface, the drive system, and the floor sensor for operating the drive system, the control system including a memory device configured to store a plurality of transition profiles, wherein at least one of the plurality of transition profiles represents a transition over an inclined floor surface, and a processor coupled to the memory device and configured to:

sense changes in the distance to the floor surface based on signals received from the floor sensor, calculate a distance traveled by the patient support apparatus over the floor surface, compare the changes in the distance to the floor surface and the distance traveled by the patient support apparatus with the plurality of transition profiles, and determine that the patient support apparatus is traveling on an inclined floor surface.

* * * * *